US011121573B1

(12) United States Patent
Oh et al.

(10) Patent No.: US 11,121,573 B1
(45) Date of Patent: Sep. 14, 2021

(54) LOW-PROFILE POWER CONVERTER

(71) Applicant: Apple Inc., Cupertino, CA (US)

(72) Inventors: InHwan Oh, Cupertino, CA (US); Zaki Moussaoui, San Carlos, CA (US); Rohan Dayal, Mountain View, CA (US); Bharat K. Patel, Cupertino, CA (US); Manisha P. Pandya, Cupertino, CA (US); Weihong Qiu, San Ramon, CA (US); Malhar V. Bhatt, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 763 days.

(21) Appl. No.: 15/476,652

(22) Filed: Mar. 31, 2017

Related U.S. Application Data

(60) Provisional application No. 62/398,154, filed on Sep. 22, 2016.

(51) Int. Cl.
 *H02J 7/02* (2016.01)
 *H02J 50/12* (2016.01)
 *H02J 50/90* (2016.01)

(52) U.S. Cl.
 CPC ............. *H02J 7/025* (2013.01); *H02J 50/12* (2016.02); *H02J 50/90* (2016.02)

(58) Field of Classification Search
 CPC .. H02J 7/025; H02J 50/90; H02J 50/12; H02J 50/001; H02J 50/005; H02J 50/10; H02J 50/30; H02J 50/40; H02J 50/402; H02J 50/50; H02J 50/502; H02J 50/60; H02J 50/70; H02J 50/80; H02J 7/00; H02J 7/0042; H02J 7/0044; H02J 7/0045
 See application file for complete search history.

(56) References Cited

U.S. PATENT DOCUMENTS

| 3,275,925 | A | * | 9/1966 | Kupferberg ............... G05F 1/56 323/273 |
| 4,628,284 | A | | 12/1986 | Bruning |
| 4,816,982 | A | | 3/1989 | Severinsky et al. |
| 4,866,367 | A | | 9/1989 | Ridley |
| 6,728,117 | B2 | | 4/2004 | Schemmann et al. |
| 6,807,073 | B1 | | 10/2004 | Scarlatescu et al. |

(Continued)

FOREIGN PATENT DOCUMENTS

WO    WO 13/182844    12/2013

OTHER PUBLICATIONS

Choi et al., "A Novel Bridgeless Single-Stage Half-Bridge AC/DC Converter," Virginia Polytechnic Institute and State University, Future Energy Electronics Center, Blacksburg, Virginia, 2010, 5 pages.

*Primary Examiner* — Drew A Dunn
*Assistant Examiner* — Sailesh Thapa
(74) *Attorney, Agent, or Firm* — Brownstein Hyatt Farber Schreck, LLP

(57) ABSTRACT

A power converter can be implemented as a series of power conversion stages, including a wireless power conversion stage. In typical embodiments, the power converter receives power directly from mains voltage and outputs power to a battery within an electronic device. A transmitter side of the power converter converts alternating current received from a power source (e.g., mains voltage) to an alternating current suitable for applying to a primary coil of the wireless power conversion stage of the power converter.

19 Claims, 17 Drawing Sheets

(56) References Cited

U.S. PATENT DOCUMENTS

| | | |
|---|---|---|
| 7,342,362 B2 | 3/2008 | Lin |
| 7,426,120 B2 | 9/2008 | Yang |
| 7,479,773 B2 | 1/2009 | Michishita |
| 7,492,135 B2 | 2/2009 | Saeki |
| 7,525,296 B2 | 4/2009 | Billig et al. |
| 7,675,275 B2 | 3/2010 | Ruobiao et al. |
| 7,911,813 B2 | 3/2011 | Yang et al. |
| 7,982,548 B2 | 7/2011 | Athas |
| 8,077,487 B2 | 12/2011 | Huynh |
| 8,125,799 B2 | 2/2012 | Zhu et al. |
| 8,587,964 B2 | 11/2013 | Yang |
| 8,629,651 B2 | 1/2014 | Guccione et al. |
| 8,643,349 B2 | 2/2014 | Chen et al. |
| 8,699,299 B2 | 4/2014 | Horsky et al. |
| 8,803,563 B2 | 8/2014 | Deng et al. |
| 8,842,450 B2 | 9/2014 | Jungreis |
| 8,917,068 B2 | 12/2014 | Chen et al. |
| 9,030,131 B2 | 5/2015 | Kado et al. |
| 9,048,739 B2 | 6/2015 | Shoji et al. |
| 9,124,184 B2 | 9/2015 | Sato et al. |
| 9,154,038 B2 | 10/2015 | Fang et al. |
| 9,166,481 B1 | 10/2015 | Vinciarelli et al. |
| 9,214,850 B2 | 12/2015 | Deng et al. |
| 9,252,676 B2 | 2/2016 | Yang et al. |
| 9,389,617 B2 | 7/2016 | Dally |
| 9,402,287 B2 | 7/2016 | Sasaki |
| 9,444,357 B1 | 9/2016 | Matthews |
| 9,461,558 B2 | 10/2016 | Bianco et al. |
| 9,479,063 B2 | 10/2016 | Pan |
| 9,484,803 B2 | 11/2016 | Turchi |
| 9,490,716 B2 | 11/2016 | Tseng et al. |
| 9,543,833 B2 | 1/2017 | Shiu et al. |
| 9,571,001 B2 | 2/2017 | Fujita |
| 9,621,053 B1 | 4/2017 | Telefus |
| 9,722,497 B2 | 8/2017 | Fang |
| 9,871,451 B2 | 1/2018 | Lin et al. |
| 9,991,794 B2 | 6/2018 | Lueders et al. |
| 2010/0259217 A1* | 10/2010 | Baarman ............... H02J 5/005 320/108 |
| 2013/0094247 A1* | 4/2013 | Kleinpenning ... H02M 3/33523 363/16 |
| 2014/0042821 A1* | 2/2014 | Boys .................... H02J 5/005 307/104 |
| 2015/0244341 A1* | 8/2015 | Ritter .................... H01F 38/14 307/104 |
| 2015/0380944 A1* | 12/2015 | Yu ......................... H02J 50/12 307/104 |
| 2015/0380948 A1* | 12/2015 | Mazaki ................ H02M 7/217 307/104 |
| 2016/0072393 A1 | 3/2016 | McIntyre |
| 2016/0094081 A1* | 3/2016 | Lee ...................... H02J 5/005 320/108 |
| 2016/0099660 A1 | 4/2016 | Khaligh |
| 2016/0118894 A1 | 4/2016 | Zhang et al. |
| 2016/0268899 A1 | 9/2016 | Rader et al. |
| 2016/0311294 A1* | 10/2016 | Swab ................... B60H 1/3232 |
| 2017/0355270 A1* | 12/2017 | Elshaer ................. H02M 3/28 |
| 2018/0004240 A1 | 1/2018 | Gritti et al. |
| 2018/0041073 A1* | 2/2018 | Oh ...................... H02M 3/156 |
| 2018/0041116 A1 | 2/2018 | Oh |
| 2018/0083490 A1 | 3/2018 | Oh et al. |
| 2018/0091054 A1 | 3/2018 | Oh et al. |
| 2019/0006886 A1* | 1/2019 | Bando ............... H02M 7/5387 |

\* cited by examiner

LOW-PROFILE POWER CONVERTER

CROSS-REFERENCE TO RELATED APPLICATION(S)

This application claims the benefit under 35 U.S.C. § 119(e) of U.S. Provisional Patent Application No. 62/398,154, filed on Sep. 22, 2016, and entitled "Low-Profile Power Converter," the contents of which are incorporated by reference as if fully disclosed herein.

FIELD

Embodiments described herein generally relate to power converters and, in particular, to operationally-efficient power converters that accept mains voltage and that can be accommodated in a low-profile enclosure.

BACKGROUND

An electronic device can receive electric power from a power source. Typically, the electronic device is coupled to a power converter that is implemented as series of independent power conversion stages. The power converter is configured to regulate or change voltage and/or current received from the power source to levels safe for use by the electronic device. In some cases, the power converter includes a wireless power transfer stage that directs power to the electronic device across an air gap by inducing a current in an electromagnetic coil within the electronic device. Such power converters can be referred to as "wireless power converters."

A typical wireless power converter couples to a power adapter that, in turn, couples to mains voltage. This configuration injects a number of additional power conversion stages between mains voltage and the electronic device, each of which contributes to aggregate operational power loss (e.g., conduction losses, switching losses, eddy current losses, and so on). Further, conventional power adapters require low-frequency transformer stages and/or switch-mode voltage conversion stages, each of which may require large-size output/bulk capacitors or large-size low-frequency transformers that cannot be easily integrated into a wireless power converter having a low-profile enclosure.

SUMMARY

Embodiments described herein generally reference a power converter implemented as a series of power conversion stages, including a wireless power conversion stage. In typical embodiments, the power converter receives power directly from mains voltage and outputs power to a battery within an electronic device.

In some embodiments, the power converter includes a rectifier stage accommodated within a housing and configured to receive mains voltage. The power converter also includes a step-down voltage converter stage accommodated within the housing. The step-down voltage converter is configured to receive a rectified voltage from the rectifier stage. The power converter also includes an inverter stage accommodated within the housing. The inverter stage is configured to receive a lowered regulated voltage from the step-down voltage converter stage. Finally, the power converter also includes a wireless power transfer stage. The wireless power transfer stage includes a primary coil accommodated within the housing and configured to receive an alternating current from the inverter stage. In these embodiments, the inverter is configured to operate at a fixed switching frequency.

Other embodiments described herein generally reference method of converting an unregulated mains voltage including the operations of rectifying the unregulated mains voltage to a first rectified voltage, reducing and regulating the first rectified voltage with a first peak-current controlled buck converter to a first reduced voltage, inverting the reduced voltage with a resonant inverter with a primary coil that induces a secondary coil to resonate, rectifying an output of the secondary coil to a second rectified voltage, reducing and regulating the second rectified voltage with a second peak-current controlled buck converter to a second reduced voltage, and charging a rechargeable battery with the second reduced voltage.

BRIEF DESCRIPTION OF THE DRAWINGS

Reference will now be made to representative embodiments illustrated in the accompanying figures. It should be understood that the following descriptions are not intended to limit this disclosure to one preferred embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1A:
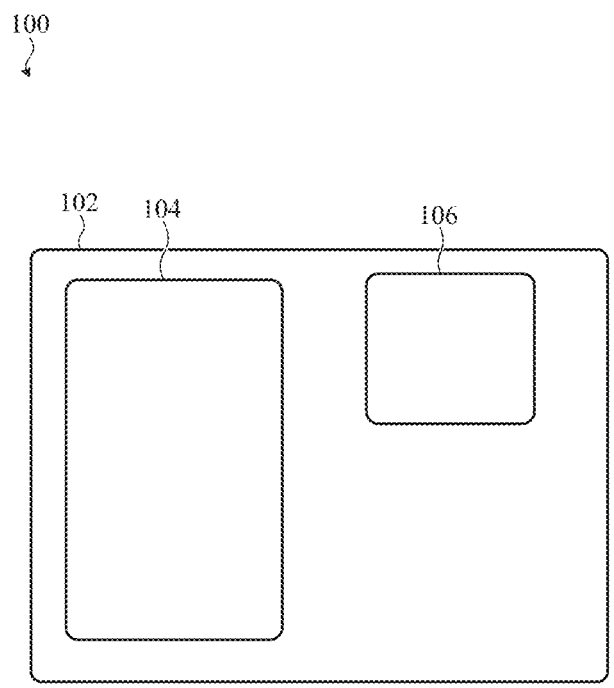
FIG. 1A depicts a power converter including a wireless power transfer stage.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein reference systems and methods for operating a power converter in a manner that efficiently converts electric power received from a power source into voltage and/or current levels usable by a load, such as a portable electronic device.

As used herein, the phrases "power converter" and "power conversion system" generally refer to a combination or order of "power conversion stages," directly or indirectly coupled to one another, that collectively convert power received from a power source to power safely usable by a load. Suitable power conversion stages including, but not limited to, filter stages, rectifier stages, inverter stages, step-up or step-down voltage conversion stages, wireless power transfer stages, battery charging stages, and so on.

For simplicity of description, the embodiments that follow reference a power converter that receives power input from mains voltage (e.g., 90 VAC-265 VAC at 50-60 Hz) and provides power output—across a wireless power transfer stage—to a variable resistive load within a portable electronic device. Such a system is generally referred to herein as a "wireless power converter." However, this configuration is not required of all embodiments and it is appreciated that a power converter and/or the various power conversion stages and circuit topologies described herein can be configured in any implementation-specific or appropriate manner to couple any suitable power source (e.g., alternating current source, direct current source, noisy or unregulated power source, and so on) to any suitable load (e.g., variable or fixed, reactive or resistive, or any combination thereof).

Generally and broadly, a wireless power converter such as described herein typically converts unregulated and/or noisy mains voltage to a low-voltage direct current usable by a battery-powered portable electronic device. The wireless power converter includes at least one wireless power transfer stage, including a primary coil and a secondary coil separated by a gap. An alternating current is applied to the primary coil, which induces a corresponding alternating current in the secondary coil. In these embodiments, the wireless power converter is functionally and structurally divided into two portions that are electrically and physically isolated from one another by the gap.

For simplicity of description, the separated portions of a wireless power converter are referred to herein as the "transmitter side" and the "receiver side." The transmitter side receives mains voltage (e.g., high-voltage, low-frequency alternating current) and converts that voltage to an alternating current suitable to apply to the primary coil of the wireless power transfer stage (e.g., low-voltage high-frequency alternating current). In many embodiments, the transmitter side is coupled directly to mains voltage and is accommodated in a single housing; an intermediate power adapter is not required. This configuration is referred to herein as a "fully-integrated" power converter.

The receiver side a wireless power converter receives a low-voltage high-frequency alternating current from the secondary coil (induced by the primary coil) and converts that current into a low-voltage direct current suitable to drive a resistive load (e.g., 3.3 VDC, 5.0 VDC, 12 VDC, 50 VDC, and so on).

In some embodiments, the transmitter side is implemented with a rectifier, a buck converter, and a resonant inverter. The rectifier receives unregulated alternating current (e.g., mains voltage) and outputs a rippled direct current. The buck converter receives the rippled direct current from the rectifier and outputs a lower-voltage, regulated, direct current. The resonant inverter receives the lower-voltage direct current from the buck converter and outputs a high-frequency alternating current. More specifically, the resonant inverter repeatedly toggles the conduction state of a voltage-controlled switch interposing the output of the buck converter and a resonant tank. In these embodiments, the primary coil of the wireless power transfer stage is a portion of the resonant tank. In this manner, the transmitter side, when referenced separately from the receiver side, can be referred to as an AC-to-AC power converter. This configuration may be more operationally efficient, and can be accommodated in a more compact or low-profile enclosure, than a conventional wireless power converter that couples to a power adapter and requires additional power conversion stages such as, but not limited to: step-up voltage conversion stages (e.g., boost converters), large-size low-frequency transformer stages, high-frequency rectification stages, high-voltage inverter stages, and so on.

In other embodiments, the transmitter side is implemented with a rectifier, a high-voltage inverter, a high-frequency voltage transformer, and a resonant inverter. As with other embodiments described herein, the rectifier receives unregulated alternating current and outputs a rippled direct current. The high-frequency inverter receives the rippled direct current and outputs a high-frequency alternating current. In some cases, the high-frequency inverter is a resonant inverter, but this may not be required. The high-frequency voltage transformer receives the high-frequency alternating current from the high-frequency inverter and outputs a lower-voltage high-frequency alternating current. The resonant inverter receives the lower-voltage high-frequency alternating current and applies that current to a resonant tank that includes the primary coil. As with other embodiments described herein, this example transmitter side, when referenced separately from the receiver side, can be referred to as an AC-to-AC power converter. As with other example embodiments described above, this example configuration may be more operationally efficient and can be accommodated in a more compact enclosure than a conventional wireless power converter that couples to a power adapter.

These and other embodiments are discussed below with reference to FIGS. 1A-12. However, those skilled in the art will readily appreciate that the detailed description given herein with respect to these figures is for explanation only and should not be construed as limiting.

Figure 1B:
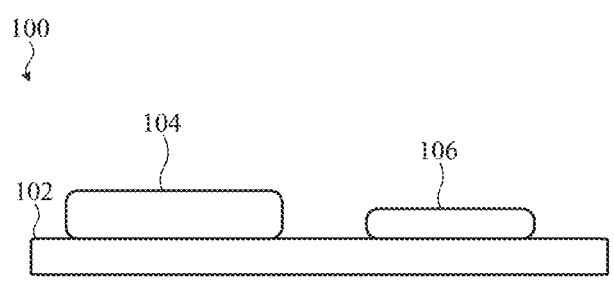
FIG. 1B depicts a side view of the power converter of FIG. 1A.

Generally and broadly, FIGS. 1A-1B depict a wireless power converter including a transmitter side and a receiver side. It will be appreciated, however, that the depicted examples are not exhaustive; the various embodiments described with reference to FIGS. 1A-1B may be modified or combined in any number of suitable or implementation-specific ways.

In particular, FIG. 1A depicts a wireless power converter 100 which, as noted above, is a power converter that includes at least one wireless power transfer stage. FIG. 1B depicts a side view of the wireless power converter 100, specifically illustrating an example embodiment in which a transmitter side of the wireless power converter 100 is accommodated in a low-profile (e.g., thin) enclosure.

The wireless power converter 100 includes a wireless power transfer stage. As noted above, a wireless power transfer stage functionally and structurally divides the wireless power converter 100 into (at least) two portions—a transmitter side and a receiver side. The transmitter side of the wireless power converter 100 includes one or more primary coils and the receiver side of the wireless power converter 100 includes one or more secondary coils.

The transmitter side—and in particular, the primary coil(s) of the wireless power transfer stage—is accommodated in a low-profile housing 102. The low-profile housing 102 can also accommodate, enclose, and/or support a processor, memory, display, battery, network connections, sensors, input/output ports, acoustic elements, haptic elements, digital and/or analog circuits for performing and/or coordinating tasks of the wireless power converter 100, and so on.

For simplicity of illustration, the low-profile housing 102 is depicted in FIG. 1A without many of these elements, each of which may be included, partially and/or entirely, within the low-profile housing 102 and may be operationally or functionally associated with the transmitter side of the wireless power converter 100. In some embodiments, the transmitter side is fully-integrated; all components of the transmitter side of the wireless power converter 100 are enclosed within the low-profile housing 102, apart from an electrical connection (e.g., cable) to mains voltage, which is not depicted in FIGS. 1A-1B.

The wireless power converter 100 also includes a receiver side. The receiver side—and in particular, the secondary coil(s) of the wireless power transfer stage—is accommodated and enclosed within a housing 104. Typically, the housing 104 is smaller than the low-profile housing 102, but this may not be required of all embodiments. As with the low-profile housing 102, the housing 104 can also accommodate a processor, memory, display, battery, network connections, sensors, input/output ports, acoustic elements, haptic elements, digital and/or analog circuits for performing and/or coordinating tasks of the wireless power converter 100 or another electronic device, and so on. For simplicity of illustration, the housing 104 is depicted in FIG. 1A without many of these elements, each of which may be included, partially and/or entirely, within the housing 104 and may be operationally or functionally associated with the receiver side of the wireless power converter 100.

In some examples, the housing 104 is an enclosure of an electronic device such as a cellular phone, a tablet computer, a wearable electronic device (e.g., watch, pendant, bracelet, necklace, anklet, ring, and so on), a peripheral input device (e.g., keyboard, mouse, trackpad, remote control, stylus, gaming device, gesture input device, and so on), an authentication device or token, and so on. In many cases, the wireless power converter 100, and in particular the receiver side of the wireless power transfer stage of the wireless power converter 100, is a portion of the electronic device and is configured to deliver power to a rechargeable battery within the housing 104.

As noted above, the wireless power converter 100 can be implemented with more than one primary coil and more than one secondary coil. In some examples, more than one secondary coil can be accommodated in the housing 104, but this may not be required. For example, in one embodiment, the wireless power converter 100 further includes a second receiver side, accommodated within a second housing 106.

As with the housing 104, the second housing 106 can be smaller than the low-profile housing 102, but this may not be required. The second housing 106, as with the housing 104, is configured to accommodate one or more secondary coils associated with the second receive side of the wireless power transmitter 100. In addition to the secondary coil(s), the secondary housing 106 can also accommodate a processor, memory, display, battery, network connections, sensors, input/output ports, acoustic elements, haptic elements, digital and/or analog circuits for performing and/or coordinating tasks of the wireless power converter 100 or another electronic device, and so on. For simplicity of illustration, the secondary housing 106 is depicted in FIG. 1A without many of these elements, each of which may be included, partially and/or entirely, within the secondary housing 106 and may be operationally or functionally associated with the second receiver side of the wireless power converter 100. As with the housing 104, the secondary housing 106 can be the enclosure of an electronic device.

In the illustrated embodiment, the low-profile housing 102 that encloses the transmitter side of the wireless power converter 100 defines an interface surface on which the housing 104 and the second housing 106 can rest. The interface surface can be substantially planar, although this is not required. For example, in some embodiments, the interface surface may be concave, convex, or may take another shape.

As noted above, in many examples, the transmitter side of the wireless power converter 100 includes more than one primary coil. In these embodiments, individual primary coils can be associated with different portions of the interface surface. In this manner, the wireless power converter 100 can selectively activate or deactivate primary coils independently. Further, the wireless power converter 100 can selectively control power output from each primary coil independently. In many cases, the wireless power converter 100 can selectively active a primary coil (or more than one primary coil) based on the position and/or orientation of the housing 104 and/or the second housing 106 relative to the interface surface and, in particular, relative to the location of a nearby primary coil. More specifically, the wireless power converter 100 can selectively activate a primary coil based on a coupling factor k that corresponds to the mutual coupling between that primary coil and a secondary coil disposed within the housing 104 or the second housing 106; the higher the coupling factor, the more likely the wireless power converter 100 is to activate that primary coil to effect power transfer from that primary coil to the secondary coil within the housing 104 or the second housing 106.

The foregoing embodiments depicted in FIGS. 1A-1B and the various alternatives thereof and variations thereto are presented, generally, for purposes of explanation, and to facilitate an understanding of various possible electronic devices or accessory devices that can incorporate, or be otherwise associated with, a wireless power converter, such as described herein. However, it will be apparent to one skilled in the art that some of the specific details presented herein may not be required in order to practice a particular described embodiment, or an equivalent thereof.

Generally and broadly, FIGS. 2A-2D depict system diagrams of certain configurations of a wireless power converter. It will be appreciated, however, that the depicted examples are not exhaustive; the various embodiments described with reference to FIGS. 2A-2D may be modified or combined in any number of suitable or implementation-specific ways.

Figure 2A:
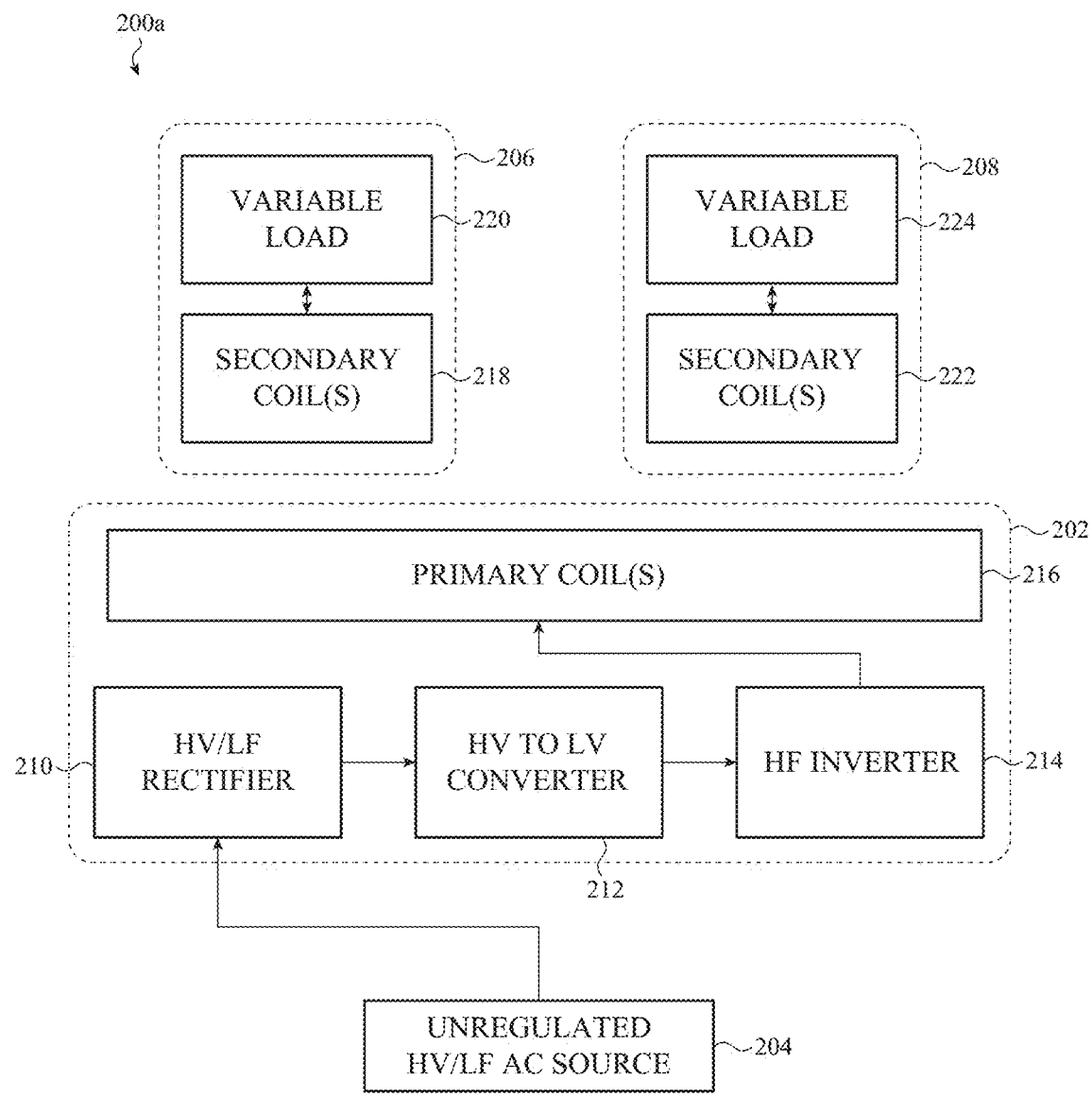
FIG. 2A is a simplified system diagram of a power converter—including a wireless power transfer stage—that receives alternating current from a power source.

In particular, FIG. 2A depicts a wireless power converter 200a which, as noted above, is a power converter that includes at least one wireless power transfer stage. The wireless power converter 200a can be accommodated in any suitable housing, although in many embodiments, the wireless power converter 200a is accommodated in a low-profile housing such as the low-profile housing 102 depicted in FIGS. 1A-1B.

The wireless power converter 200a includes a transmitter side 202 that is directly coupled to a power source 204. The wireless power converter 200a also includes a first receiver side 206 and a second receiver side 208 that are each independently configured to receive power from the transmitter side 202 of the wireless power converter 200a.

In the illustrated embodiment, the power source 204 outputs unregulated or otherwise noisy (or variable) alternating current at a high voltage and a low frequency. For example, the power source 204 may be configured to output mains voltage that can vary from 90.0 VAC to 265 VAC and may vary from 50 Hz to 60 Hz.

The transmitter side 202 of the wireless power converter 200a includes a rectifier stage 210, a high-frequency inverter stage 214, a step-down voltage converter stage 212, and one or more primary coils (identified as the primary coils 216).

Each receiver side of the wireless power converter 200a (e.g., the first receiver side 206 and the second receiver side 208) includes one or more secondary coils and one or more variable loads. In the illustrated embodiment, the first receiver side 206 includes the secondary coil(s) 218 and a variable load 220. The second receiver side 208 includes the secondary coil(s) 222 and a variable load 224. In many embodiments, the first receiver side 206 and the second receiver side 208 are implemented in a similar manner, although this may not be required.

The rectifier stage 210 of the transmitter side 202 is configured to receive the unregulated high-voltage, low-frequency alternating current output from the power source 204 (e.g., ~90 VAC to ~265 VAC at 50 Hz to 60 Hz or another suitable voltage or frequency). The rectifier stage 210 is configured to output high-voltage rippled direct current (e.g., ~80 VDC to ~240 VDC, rippled, or another suitable voltage). The rectifier stage 210 can be a half-bridge rectifier or a full-bridge rectifier. In some embodiments, a filter (e.g., a capacitor or capacitor network parallel to the output of the rectifier or an inductor-capacitor choke or filter) is added in parallel to the output of the rectifier to further smooth the rippled direct current waveform, although in many cases such as filter may be prohibitively large to incorporate into a low-profile housing. The rectifier stage 210 can be implemented in any number of suitable ways. For example, the rectifier stage 210 can be a synchronous or passive rectifier.

The step-down voltage converter stage 212 of the transmitter side 202 is configured to receive the high-voltage direct current output from the rectifier stage 210. The step-down voltage converter stage 212 can be implemented with a switch-mode power converter, such as a buck converter. In some cases, the buck converter can be a peak-current controlled buck converter, although this is not required. In other examples, the step-down voltage converter stage 212 is implemented with a step-down transformer. As may be appreciated, the physical size of a step-down transformer is related to the frequency of the alternating current that is applied to the step-down transformer. More specifically, as the switching frequency output from the increases, the physical size of the step-down transformer can be decreased. Accordingly, in many embodiments, the step-down voltage converter stage 212 can be accommodated in a low-profile housing, such as the low-profile housing 102 depicted in FIGS. 1A-1B.

The high-frequency inverter stage 214 of the transmitter side 202 is configured to receive the low-voltage direct current output from the step-down voltage converter stage 212 and configured to output a high-frequency, low-voltage alternating current (e.g., ~20 VAC to ~100 VAC at 130 kHz to 230 kHz or another suitable voltage or frequency). In some cases, the high-frequency inverter stage 214 is a resonant inverter, but this may not be required. The high-frequency inverter stage 214 can be implemented as a half-bridge or a full-bridge inverter. The operational frequency of the high-frequency inverter stage 214 can be determined based on a frequency at which the primary coils 216 and/or the secondary coils 218 or the secondary coils 222 are operated and/or resonate.

As noted above, the step-down voltage converter stage 212 is configured to reduce the direct current output from the rectifier stage 210 to a level suitable to apply to the high-frequency inverter stage 214. In one example, the high-frequency inverter stage 214 is configured to output ~100 VAC. In other examples, other voltage levels can be selected.

The primary coils 216 of the transmitter side 202 are each configured to receive the high-frequency, lower-voltage alternating current output (e.g., ~50 VAC at 130 kHz to 230 kHz, or another suitable voltage or frequency) from the high-frequency inverter stage 214. In some embodiments, a single primary coil can be activated at a time whereas in other embodiments, multiple transmit coils can be activated simultaneously. In many cases, one or more of the primary coils 216 are configured to resonate. In many cases, the primary coils 216 are configured to resonate at the frequency of the high-frequency, lower-voltage alternating current output received from the step-down voltage converter stage 212.

As noted with respect to other embodiments described herein the receiver side(s) of the wireless power converter 200*a* can be implemented in any suitable manner and/or can be bodily incorporated into any suitable electronic device. In one embodiment, the first receiver side 206 is associated with a cellular phone whereas the second receiver side 208 is associated with a wearable electronic device. In still further embodiments, the first receiver side 206 and the second receiver side 208 can each be incorporated into the housing of a single electronic device.

The secondary coils 218 of the first receiver side 206 are each configured to receive the high-frequency, lower-voltage alternating current from the primary coils 216 (via mutual induction). The variable load 220 of the first receiver side 206 is configured to receive high-frequency, lower-voltage alternating current from the secondary coils 218. In many cases, the variable load 220 further converts the high-frequency, lower-voltage alternating current to direct current. For example, the variable load 220 can include a rectifier (e.g., synchronous or passive) that rectifies the lower-voltage alternating current received from the secondary coils 218.

Similarly, the secondary coils 222 of the second receiver side 208 are each configured to receive the high-frequency, lower-voltage alternating current from the primary coils 216 (via mutual induction). The variable load 224 of the second receiver side 208 is configured to receive high-frequency, lower-voltage alternating current from the secondary coils 222. In many cases, the variable load 224 further converts the high-frequency, lower-voltage alternating current to direct current. For example, the variable load 224 can include a rectifier (e.g., synchronous or passive) that rectifies the lower-voltage alternating current received from the secondary coils 222.

The foregoing embodiment depicted in FIG. 2A and the various alternatives thereof and variations thereto are presented, generally, for purposes of explanation, and to facilitate a thorough understanding of various possible configurations of a wireless power converter that incorporates a fully-integrated transmitter side and at least one receiver side coupled by a wireless power transfer stage. In this embodiment, the fully-integrated transmitter side is configured to convert poorly-regulated mains voltage to regulated high-frequency low-voltage that is suitable to energize a primary coil of a wireless power transfer stage of the wireless power converter. The fully-integrated transmitter side can be accommodated in a low-profile housing as a result of the high-frequency operation of the step-down voltage converter stage 212. More specifically, the step-down voltage converter stage 212 and the high-frequency inverter stage 214 can be implemented with physically smaller components as a result of the high-frequency operation.

However, a fully-integrated transmit side may not be required of all wireless power converter embodiments and it will be apparent to one skilled in the art that some of the specific details presented herein may not be required in order to practice a particular described embodiment, or an equivalent thereof.

For example, in one embodiment, the transmitter side of the wireless power converter 200*a* can be referred to as a "charging mat" and a receiver side can be referred to as an "electronic device." In this example, the charging mat is coupled directly to mains voltage; no intermediate power adapter or converter is used. More specifically, the charging mat receives mains voltage, converts that mains voltage to a high-frequency alternating current, and applies the high frequency alternating current to a transmit coil (e.g., a primary coil of the wireless power transfer stage of the wireless power converter 200*a*) within the charging mat. As such, the charging mat can be referred to as an AC-to-AC power converter. The transmit coil is positioned below a charging surface, which is an external surface of the charging mat.

In this example, the electronic device includes a receive coil (e.g., a secondary coil of the wireless power transfer stage of the wireless power converter 200*a*) that is magnetically coupled to the transmit coil. The electronic device includes one or more subsequent power conversion stages coupled to the output of the receive coil. The subsequent power conversion stages can include boost converters, buck converters, voltage regulators, and so on. The subsequent power conversion stages are configured to convert the high-frequency alternating current received by the receive coil to a well-regulated direct current that can be used by the electronic device. In one example, the electronic device includes a rechargeable battery; the well-regulated direct current can be used to recharge the rechargeable battery. In this manner, a user of the electronic device can place the electronic device on the charging surface in order to recharge the rechargeable battery of the electronic device.

In a further implementation of the example provided above, the electronic device is a cellular phone. The charging mat can be configured to detect the presence of the cellular phone on the charging surface via any suitable means, such as by inductive detection (e.g., detect the presence of the receive coil and/or an electrically conductive portion of the housing of the cellular phone), capacitive detection (e.g., detect the presence of the housing of the electronic device on the charging mat), or via any other suitable method.

Once the charging mat detects the presence of the cellular phone, the charging mat can open a communication channel (e.g., Wi-Fi, Bluetooth, Near-Field Communications, infrared, electric field coupling, radio link, inductive link, and so on) with the cellular phone to negotiate an amount of power to be transferred from the charging mat—via a transmit coil—to the receive coil within the cellular phone. In some cases, the charging mat can authenticate the cellular phone prior to transferring power.

In a further implementation of the example referenced above, the charging mat can be configured to detect a position and/or an orientation of the cellular phone when the user places the cellular phone on the charging surface. More particularly, the charging mat can be configured to determine which transmit coil—or transmit coils—among an array of transmit coils positioned below the charging surface should be energized in order to effectuate an efficient power transfer to the receive coil of the cellular phone.

In a further implementation of the example provided above, the charging mat can be configured to detect the presence of a second electronic device on the charging surface. In one example, the second electronic device is a wearable electronic device, such as a watch. The watch can be placed on the charging surface of the charging mat adjacent to the cellular phone or separately from the cellular phone, or at any suitable location. After detecting the presence of the watch, the charging mat can open a communications channel with the watch to negotiate an amount of power to be transferred from the charging mat to the watch.

In some cases, the charging mat can be configured to deliver different amounts of power—simultaneously—to different devices, although this is not required of all embodiments. In still further embodiments, the charging mat or, more generally, a transmit side of a wireless power converter need not be fully-integrated. In other words, in some embodiments, the various power conversion stages of a transmit side of a wireless power converter can be manufactured, enclosed, or otherwise implemented separately.

Figure 2B:
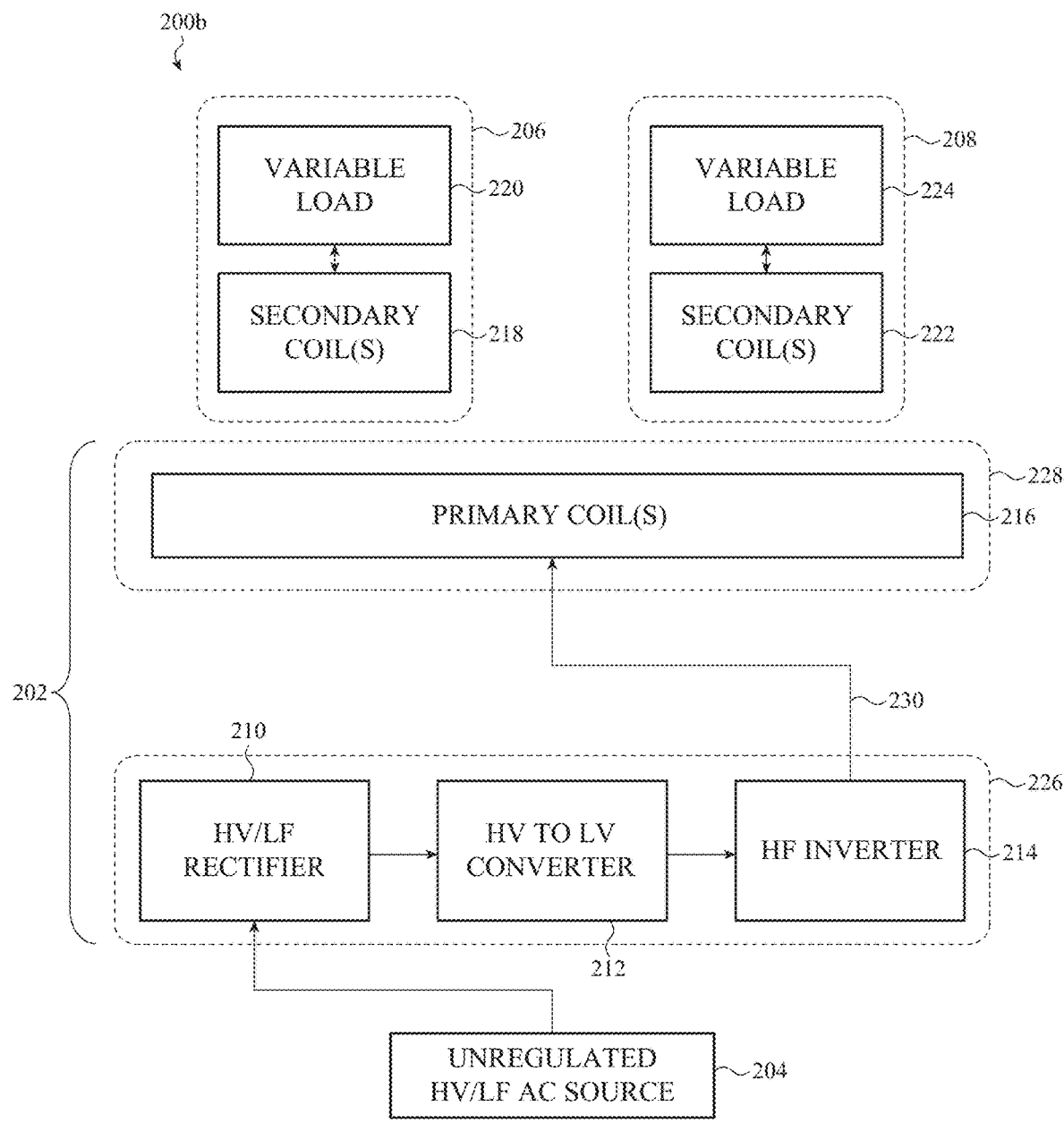
FIG. 2B is a simplified system diagram of a power converter that outputs alternating current suitable for wireless power transfer.

For example, FIG. 2B depicts a wireless power converter 200b which, as noted above, is a power converter that includes at least one wireless power transfer stage. As with the embodiment depicted and described in reference to FIG. 2A, the wireless power converter 200b shown in FIG. 2B includes a transmitter side 202 that is directly coupled to a power source 204. The wireless power converter 200b also includes a first receiver side 206 and a second receiver side 208 that are each independently configured to receive power from the transmitter side 202 of the wireless power converter 200b.

The transmitter side 202 of the wireless power converter 200b includes a rectifier stage 210, a high-frequency inverter stage 214, a step-down voltage converter stage 212, and one or more primary coils (identified as the primary coils 216). Each receiver side of the wireless power converter 200b (e.g., the first receiver side 206 and the second receiver side 208) includes one or more secondary coils and one or more variable loads. In the illustrated embodiment, the first receiver side 206 includes the secondary coil(s) 218 and a variable load 220. The second receiver side 208 includes the secondary coil(s) 222 and a variable load 224.

In the illustrated embodiment, the rectifier stage 210, the high-frequency inverter stage 214, the step-down voltage converter stage 212 can be accommodated in a first housing 226 and the primary coils 216 can be accommodated in a second housing 228. The primary coils 216 can be coupled to the output of the high-frequency inverter stage 214 via a cable 230.

In this embodiment, the rectifier stage 210 of the transmitter side 202 is configured to receive the unregulated high-voltage, low-frequency alternating current output from the power source 204. The rectifier stage 210 is configured to output high-voltage rippled direct current. The step-down voltage converter stage 212 of the transmitter side 202 is configured to receive the rectified high-voltage rippled direct current output from the rectifier stage 210 and outputs a low-voltage direct current to the high-frequency inverter stage 214. The operational frequency of the high-frequency inverter stage 214 can be determined based on a frequency at which the primary coils 216 and/or the secondary coils 218 or the secondary coils 222 are operated and/or configured to resonate.

The primary coils 216 of the transmitter side 202 are each configured to receive the high-frequency, lower-voltage alternating current output from the high-frequency inverter stage 212. As with other embodiments described herein, a single primary coil can be activated at a time whereas in other embodiments, multiple transmit coils can be activated simultaneously. In many cases, one or more of the primary coils 216 are configured to resonate. In many cases, the primary coils 216 are configured to resonate at the frequency of the high-frequency, lower-voltage alternating current output received from the high-voltage inverter stage 212.

As noted with respect to other embodiments described herein the receiver side(s) of the wireless power converter 200b can be implemented in any suitable manner and/or can be bodily incorporated into any suitable electronic device. In one embodiment, the first receiver side 206 is associated with a cellular phone whereas the second receiver side 208 is associated with a wearable electronic device. In still further embodiments, the first receiver side 206 and the second receiver side 208 can each be incorporated into the housing of a single electronic device.

The secondary coils 218 of the first receiver side 206 are each configured to receive the high-frequency, lower-voltage alternating current from the primary coils 216 (via mutual induction). The variable load 220 of the first receiver side 206 is configured to receive high-frequency, lower-voltage alternating current from the secondary coils 218. In many cases, the variable load 220 includes further power conversion stages that further convert the high-frequency, lower-voltage alternating current to direct current. The second receiver side 208 can be implemented in a similar manner.

The foregoing embodiment depicted in FIG. 2B and the various alternatives thereof and variations thereto are presented, generally, for purposes of explanation, and to facilitate a thorough understanding of various possible configurations of a wireless power converter. In this embodiment, the transmitter side includes two separately-implemented portions, one that configured to convert poorly-regulated mains voltage to regulated high-frequency low-voltage, and one that is configured to energize a primary coil of a wireless power transfer stage of the wireless power converter. However, it may be appreciated that such a configuration may not be required of all embodiments.

Figure 2C:
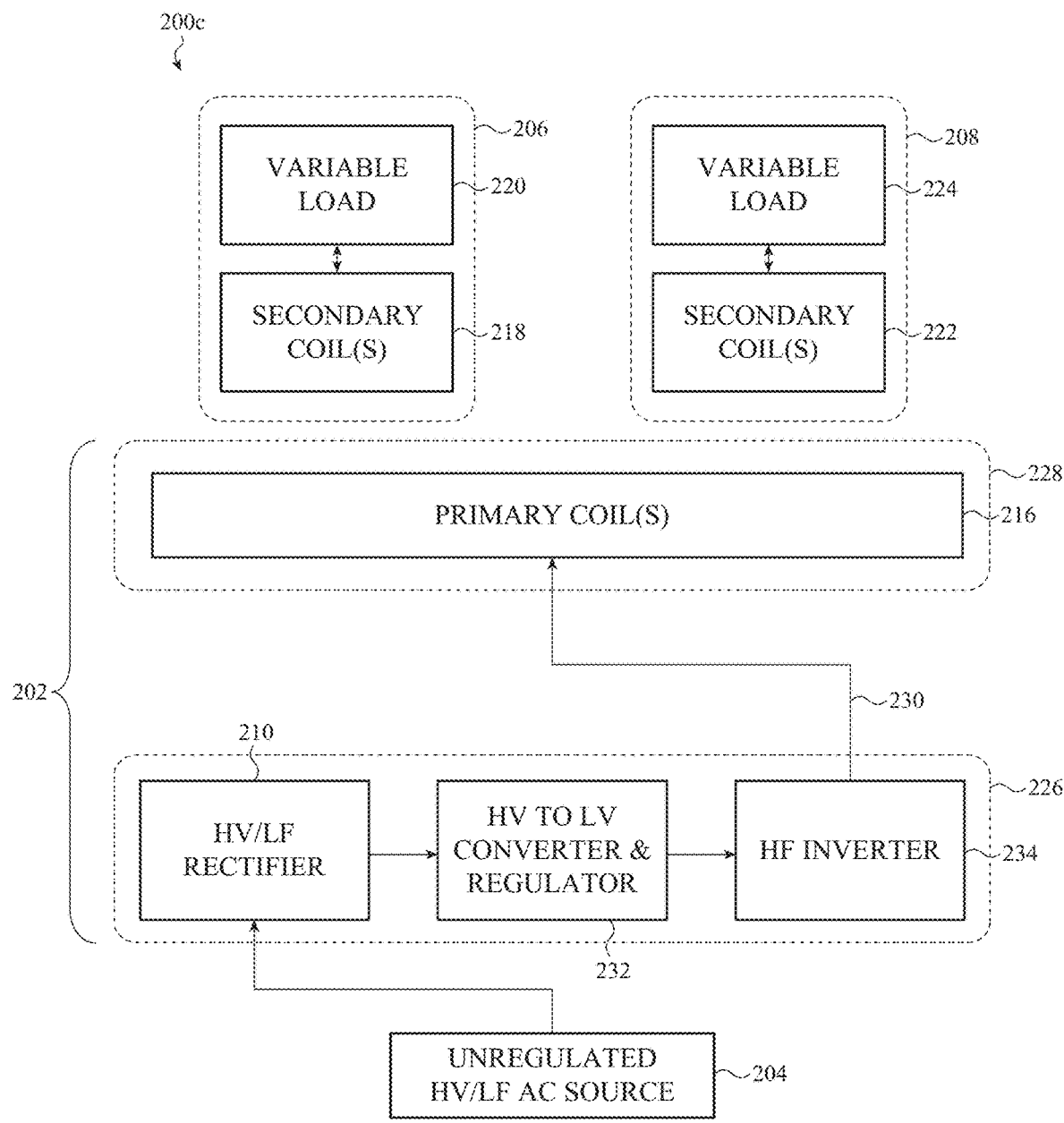
FIG. 2C is a simplified system diagram of another power converter that outputs alternating current suitable for wireless power transfer.

For example, FIG. 2C depicts a wireless power converter 200c that includes a transmitter side 202 that is directly coupled to a power source 204. The wireless power converter 200c also includes a first receiver side 206 and a second receiver side 208 that are each independently configured to receive power from the transmitter side 202 of the wireless power converter 200c.

As with other embodiments described herein, the power source 204 outputs unregulated or otherwise noisy (or variable) alternating current at a high voltage and a low frequency. For example, the power source 204 may be configured to output mains voltage that can vary from 90.0 VAC to 265 VAC and may vary from 50 Hz to 60 Hz.

Each receiver side of the wireless power converter 200c (e.g., the first receiver side 206 and the second receiver side 208) includes one or more secondary coils and one or more variable loads. In the illustrated embodiment, the first receiver side 206 includes the secondary coil(s) 218 and a variable load 220. The second receiver side 208 includes the secondary coil(s) 222 and a variable load 224. In many embodiments, the first receiver side 206 and the second receiver side 208 are implemented in a similar manner, although this may not be required.

As with the embodiment depicted in FIG. 2B, the transmitter side 202 of the wireless power converter 200c can be separated into a first housing 226 and a second housing 228. Components accommodated in the first housing 226 can be electrically coupled to components accommodated in the second housing 228 via the cable 230.

More specifically, the first housing 226 can be configured to accommodate a rectifier stage 210, a voltage converter stage 232, and a high-frequency inverter stage 234. The second housing 228 can be configured to accommodate one or more primary coils, identified in the illustrated embodiment as the primary coils 216.

The rectifier stage 210 of the transmitter side 202 is configured to receive the unregulated high-voltage, low-frequency alternating current output from the power source 204 (e.g., ~90 VAC to ~265 VAC at 50 Hz to 60 Hz or another suitable voltage or frequency). The rectifier stage 210 is configured to output high-voltage rippled direct current (e.g., ~80 VDC to ~240 VDC, rippled, or another suitable voltage). The rectifier stage 210 can be a half-bridge rectifier or a full-bridge rectifier. As with other embodiments described herein, a filter (e.g., a capacitor or capacitor network parallel to the output of the rectifier or an inductor-capacitor choke or filter) is added in parallel to the output of the rectifier to further smooth the rippled direct current waveform, although in many cases such as filter may be prohibitively large to incorporate into a low-profile housing. The rectifier stage 210 can be implemented in any number of suitable ways. For example, the rectifier stage 210 can be a synchronous or passive rectifier.

The voltage converter stage 232 of the transmitter side 202 is configured to receive the rectified high-voltage rippled direct current output from the rectifier stage 210 and outputs a low-voltage direct current. In some cases, the voltage converter stage 232 is a resonant buck converter, but this may not be required.

The high-frequency inverter stage 234 receives the lower-voltage direct current from the voltage converter stage 232 and outputs a high-frequency alternating current. More specifically, the high-frequency inverter stage 234 repeatedly toggles the conduction state of a voltage-controlled switch interposing the output of the voltage converter stage 232 and a resonant tank circuit. In these embodiments, one or more of the primary coils 216 serve as a portion of the resonant tank. In this manner, the transmitter side 202 can be referred to as an AC-to-AC power converter.

The primary coils 216 of the transmitter side 202 are each configured to receive the high-frequency, lower-voltage alternating current output (e.g., ~5 VAC at 130 kHz to 230 kHz, or another suitable voltage or frequency) from the high-frequency inverter stage 234. As with other embodiments described herein, a single primary coil can be activated at a time whereas in other embodiments, multiple transmit coils can be activated simultaneously. In many cases, one or more of the primary coils 216 are configured to resonate. In many cases, the primary coils 216 are configured to resonate at the frequency of the high-frequency, lower-voltage alternating current output received from the high-frequency inverter stage 234.

As noted with respect to other embodiments described herein the receiver side(s) of the wireless power converter 200c can be implemented in any suitable manner and/or can be bodily incorporated into any suitable electronic device. In one embodiment, the first receiver side 206 is associated with a cellular phone whereas the second receiver side 208 is associated with a wearable electronic device. In still further embodiments, the first receiver side 206 and the second receiver side 208 can each be incorporated into the housing of a single electronic device.

The secondary coils 218 of the first receiver side 206 are each configured to receive the high-frequency, lower-voltage alternating current from the primary coils 216 (via mutual induction). The variable load 220 of the first receiver side 206 is configured to receive high-frequency, lower-voltage alternating current from the secondary coils 218. In many cases, the variable load 220 further converts the high-frequency, lower-voltage alternating current to direct current. For example, the variable load 220 can include a rectifier (e.g., synchronous or passive) that rectifies the lower-voltage alternating current received from the secondary coils 218.

Similarly, the secondary coils 222 of the second receiver side 208 are each configured to receive the high-frequency, lower-voltage alternating current from the primary coils 216 (via mutual induction). The variable load 224 of the second receiver side 208 is configured to receive high-frequency, lower-voltage alternating current from the secondary coils 222. In many cases, the variable load 224 further converts the high-frequency, lower-voltage alternating current to direct current. For example, the variable load 224 can include a rectifier (e.g., synchronous or passive) that rectifies the lower-voltage alternating current received from the secondary coils 222.

The foregoing embodiment depicted in FIG. 2C and the various alternatives thereof and variations thereto are presented, generally, for purposes of explanation, and to facilitate a thorough understanding of various possible configurations of a wireless power converter. In this embodiment, as with the embodiment depicted in FIG. 2B, the transmitter side includes two separately-implemented portions, one that configured to convert poorly-regulated mains voltage to regulated high-frequency low-voltage, and one that is configured to energize a primary coil of a wireless power transfer stage of the wireless power converter. In other cases, the embodiment depicted in FIG. 2C can include a fully-integrated transmit side. As such, it is appreciated that the various specific examples presented above are not intended to be an exhaustive list of potential configurations of a wireless power converter, such as described herein.

Figure 2D:
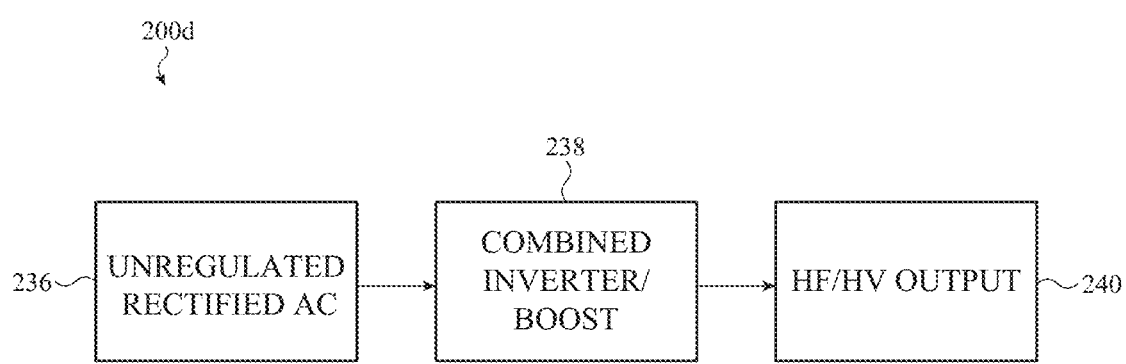
FIG. 2D is a simplified system diagram of yet another power converter that outputs alternating current suitable for wireless power transfer.

For example, FIG. 2D depicts a simplified system diagram of yet another power converter that outputs alternating current suitable for wireless power transfer. In this embodiment, a power converter 200d may require high-voltage, high-frequency output.

In the illustrated embodiment, the power converter 200d receives unregulated, rectified power from a power source 236. The power source 236 may be the output of a rectifier coupled to an unregulated or otherwise noise alternating current power source, such as mains voltage, but this may not be required of all embodiments.

The power converter 200d further includes a combined inverter and voltage converter stage 238. The combined inverter and voltage converter stage 238 is configured to output boosted direct current. In this manner, a high-frequency and high-voltage output 240 is achieved.

The foregoing embodiments depicted in FIGS. 2A-2D and the various alternatives thereof and variations thereto are presented, generally, for purposes of explanation, and to facilitate an understanding of various possible electronic devices or accessory devices that can incorporate, or be otherwise associated with, a wireless power converter, such as described herein. However, it will be apparent to one skilled in the art that some of the specific details presented herein may not be required in order to practice a particular described embodiment, or an equivalent thereof.

Figure 3:
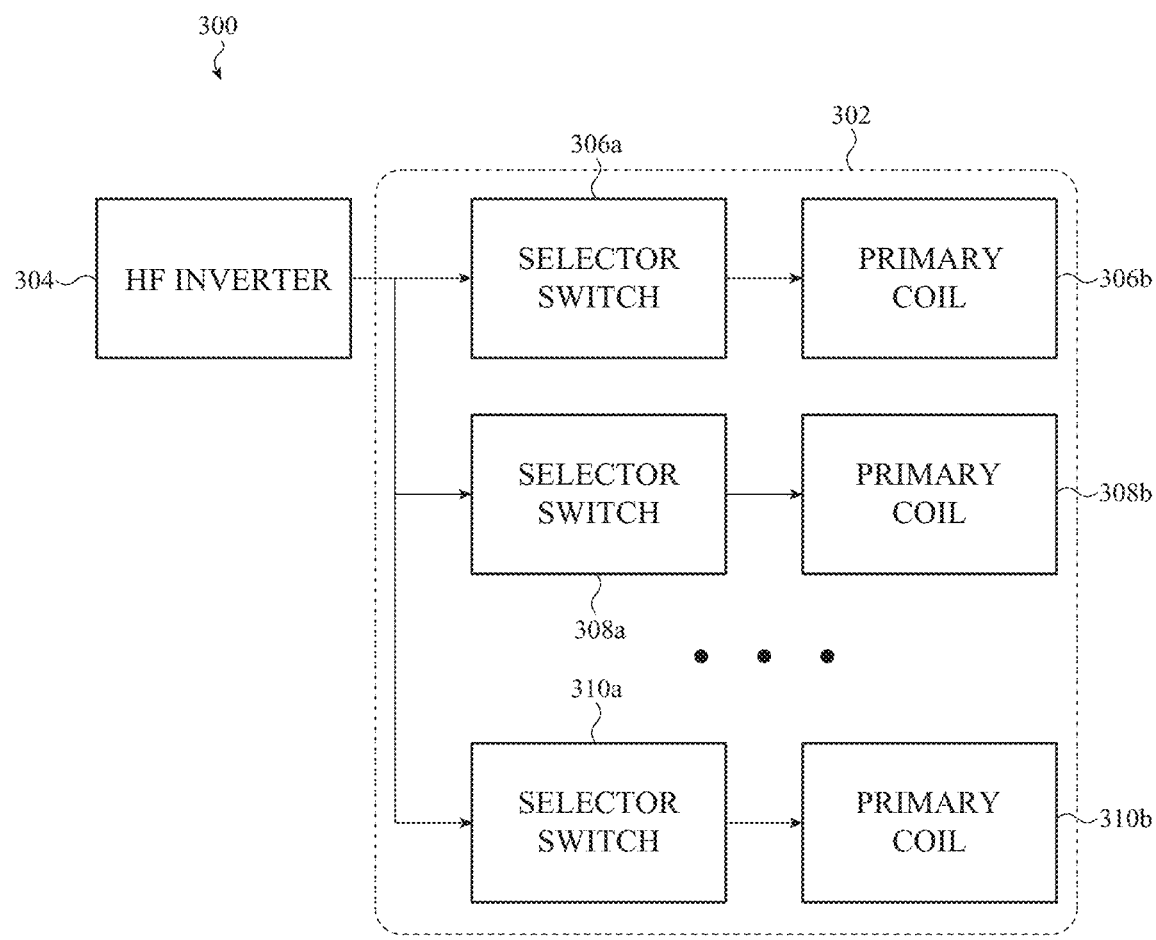
FIG. 3 is a simplified system diagram of a wireless power transfer stage of a power converter such as described herein, particularly illustrating an array of selectable primary coils.
Figure 4:
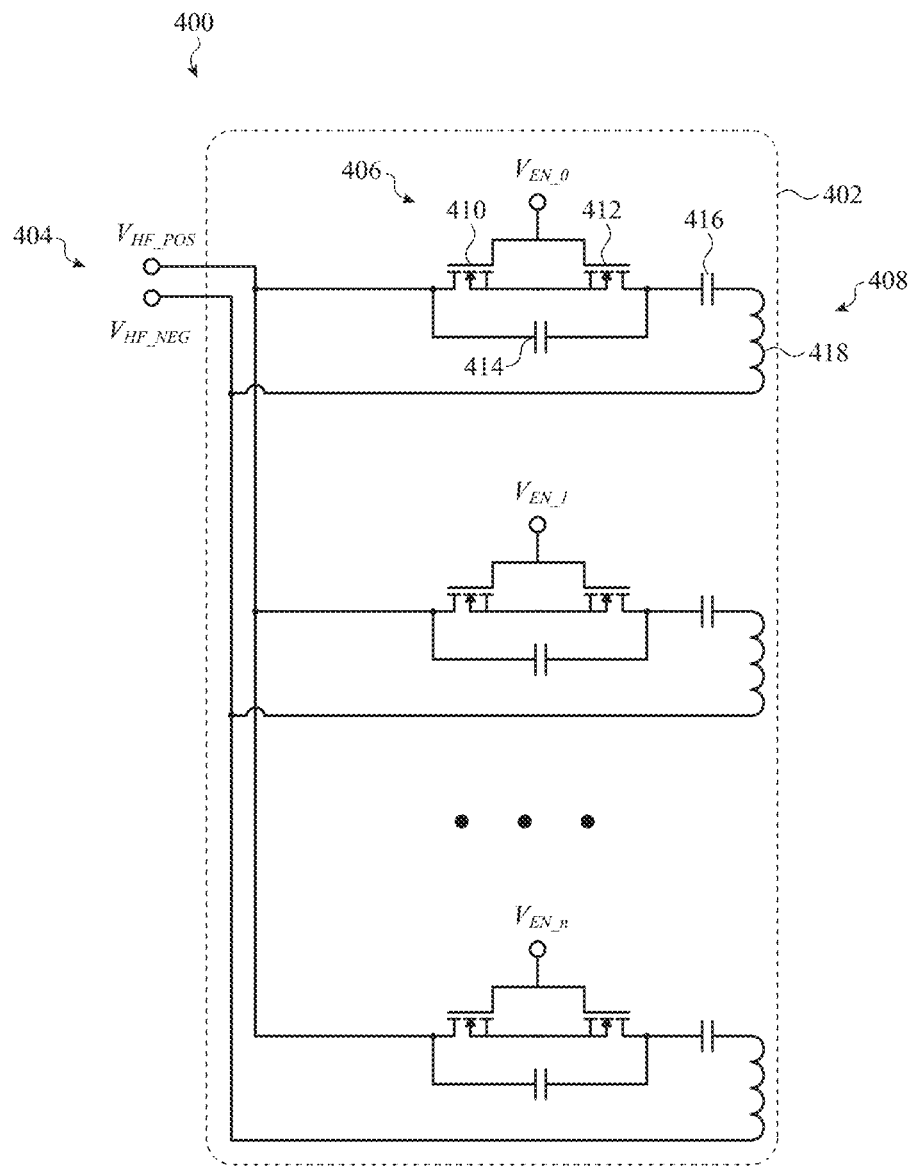
FIG. 4 is a simplified schematic diagram of a wireless power transfer stage of a power converter such as described herein, particularly illustrating an array of selectable primary coils.

Generally and broadly, FIGS. 3-4 reference a system and method for controlling and/or adjusting the amount of power applied to one or more primary coils of a transmitter side of a wireless power transfer stage, such as described herein. It will be appreciated, however, that the depicted examples are not exhaustive; the various embodiments described with reference to FIGS. 3-4 may be modified or combined in any number of suitable or implementation-specific ways.

FIG. 3 depicts a simplified system diagram of a transmitter side 300 of a wireless power transfer stage of a power converter, such as described herein. The transmitter side 300 includes a primary coil array 302 that receives low-voltage high-frequency alternating current from a previous power conversion stage 304, such as a high frequency inverter stage. The primary coil array 302 includes an array of selection circuits, each associated with a respective one primary coil. In particular, three selection circuits are identified as the selection circuits 306a, 308a, and 310a. Similarly, three primary coils are identified as the primary coils 306b, 308b, and 310b.

The transmitter side 300 is communicably coupled to a controller (not shown) which is configured to provide a control signal, individually, to each of the selection circuits 306a, 308a, and 310a. The duty cycle of a control signal applied to a particular selection switch proportionately effects the amount of power that may be output from the respective primary coil associated with the particular selection switch.

In these embodiments, each of the primary coils 306b, 308b, and 310b are configured to resonate. As a result of the resonant configuration of the primary coils 306b, 308b, and 310b, the shape of the voltage waveforms applied across the terminals of the primary coils 306b, 308b, and 310b (as a result of the control signals applied to the associated selection switch) is functionally inconsequential. In other words, when the primary coils 306b, 308b, and 310b are operating at resonance, current through the primary coils oscillates sinusoidally at the resonance frequency, transferring power to a corresponding resonating secondary coil (not shown) via electromagnetic induction. Therefore, the voltage waveform of the control signal applied to the primary coils can be a square wave, a triangle wave, a saw-tooth wave, a pulse-width modulated signal, or any other suitable wave or signal that has a frequency component at the resonance frequency of the primary coil.

In many examples, the selection circuits 306a, 308a, and 310a are each implemented with a bidirectional blocking MOSFET circuit topology. More specifically, for a single selection switch, two MOSFETs can be coupled in series together, and in series with the respective primary coil. These MOSFETs are coupled such that the body diodes of the MOSFETs conduct current of opposite polarity. In this manner, the control signal generated by the controller can be applied to the gates of the two MOSFETs of a particular selection circuit, causing both MOSFETs to conduct current through the associated primary coil—regardless of that current's polarity. In other words, when the MOSFETs of a particular selection circuit are conducting, the associated primary coil is in an "active" state, and is able to resonate.

Alternatively, when the MOSFETs of a particular selection circuit are not conducting, the opposing body diodes in the MOSFETs prevent conduction of current, regardless of polarity. In other words, when the MOSFETs of a particular selection circuit are not conducting, the associated primary coil is in an "inactive" state, and is not able to resonate.

In this manner, by controlling the conduction state of the MOSFETs of a particular selection circuit, power received from the previous power conversion stage 304, and thereafter delivered to a particular primary coil (such as one or more of the primary coils 306b, 308b, and 310b) can be finely controlled.

In further embodiments, such as illustrated, an auxiliary capacitor is positioned parallel to the MOSFETs of a particular selection circuit. As a result of this configuration, when the MOSFETs are not conducting, and the associated primary coil is inactive, the auxiliary capacitor is in series with the primary coil, thereby adjusting the resonant frequency of that primary coil.

Further to the embodiment depicted in FIG. 3 and described above, FIG. 4 depicts a simplified system diagram of a transmitter side 400 of a wireless power transfer stage of a power converter, such as described herein. The transmitter side 400 includes a primary coil array 402 that receives low-voltage high-frequency alternating current from a previous power conversion stage 304. The primary coil array 402 includes an array of selection circuits each associated with a respective one resonant circuit. In the illustrated embodiment, one selection circuit is identified as the selection circuit 406 and one resonant circuit is identified as the resonant circuit 408.

The selection circuit 406 is implemented with a bidirectional blocking MOSFET topology. More specifically, as illustrated two N-channel MOSFETs, identified as the first MOSFET 410 and the second MOSFET 412 are coupled in series together. In particular the source of the first MOSFET 410 is coupled to the source of the second MOSFET 412. In this configuration, the body diode of the first MOSFET 410 (not shown) is oriented opposite from the body diode of the second MOSFET 412. As a result of this topology, the first MOSFET 410 and the second MOSFET 412 can conduct current with any polarity only when both the first MOSFET 410 and the second MOSFET 412 are conducting. In other words, the resonant circuit 408 is active, and permitted to resonate (e.g., conduct current in both directions) only when the first MOSFET 410 and the second MOSFET 412 are both conducting.

For example, if only the first MOSFET 410 is conducting only positive polarity current can flow as a result of the orientation of the body diode of the second MOSFET 412. Similarly, if only the second MOSFET 412 is conducting, only negative polarity current can flow as a result of the orientation of the body diode of the first MOSFET 410. If neither the first MOSFET 410 nor the second MOSFET 412 is conducting, the current flow is blocked in both directions; positive current flow is blocked by the body diode of the first MOSFET 410 and negative current flow is blocked by the body diode of the second MOSFET 412.

In the illustrated embodiment, the gates of the first MOSFET 410 and the second MOSFET 412 are bonded to one another, but this is not required of all embodiments; the first MOSFET 410 and the second MOSFET 412 can be separately controlled in certain embodiments.

In some examples, including the illustrated embodiment, the selection circuit 406 further includes an auxiliary capacitor 414. The auxiliary capacitor 414 is coupled parallel to the first MOSFET 410 and the second MOSFET 412. The resonant circuit 408, which is coupled in series with the selection circuit 406, includes a capacitor 416 and an inductor 418. In many embodiments, the inductor 418 is a primary coil of a wireless power transfer stage such as described herein, but this may not be required.

As a result of this topology, when the first MOSFET 410 and the second MOSFET 412 are conducting, the auxiliary capacitor 414 is shorted and does not affect the resonance frequency of the resonant circuit 408. Alternatively, when the first MOSFET 410 and the second MOSFET 412 are not conducting, the auxiliary capacitor 414 changes the resonance frequency of the resonant circuit 408.

The foregoing embodiments depicted in FIGS. 3-4 and the various alternatives thereof and variations thereto are presented, generally, for purposes of explanation, and to facilitate an understanding of various possible techniques for controlling the power output from a primary coil of a wireless power converter, such as described herein. However, it will be apparent to one skilled in the art that some of the specific details presented herein may not be required in order to practice a particular described embodiment, or an equivalent thereof.

Generally and broadly, FIGS. 5A-7B reference a transmitter side of a wireless power converter, such as described herein. In these embodiments, the transmitter side receives unregulated and/or noisy low-frequency high-voltage power directly from a power source (e.g. mains voltage). The transmitter side includes a buck converter (or other suitable step-down voltage converter) that is configured reduce and regulate the low-frequency high-voltage to a lower direct current voltage level. The output of the buck converter is then coupled to a high-frequency inverter operated at a fixed switching frequency. The inverter serves as the primary coil of the wireless power transfer stage. The inverter can be magnetically coupled to a secondary coil (not shown) of the same wireless power transfer stage. In this example, the wireless power transfer stage is configured to resonate at a fixed frequency that is selected to minimize gain variation across the wireless power transfer stage.

More specifically, the resonant frequency of the primary coil and the secondary coil of the wireless power transfer stage can be selected for optimal performance at a wide variety of coupling factors (e.g., poor coupling between the primary coil and the secondary coil, good coupling between the primary coil and the secondary coil, ideal coupling between the primary coil and the secondary coil, and so on) and at a wide variety of load impedance across the leads of the secondary coil.

In other words, the embodiment described in reference to FIGS. 5A-7B can effectively convert unregulated and/or noisy alternating current received in a transmitter side of a wireless power conversion system to well-regulated direct current within a receiver side of the same system. This implementation does not require load impedance feedback from the receiver side and, as such, can efficiently convert unregulated alternated current to well-regulated direct current in a manner that is minimally impacted by loading of the secondary coil and in a manner that is minimally impacted by changes in the quality of the coupling between the primary coil and the secondary coil.

Figure 5A:
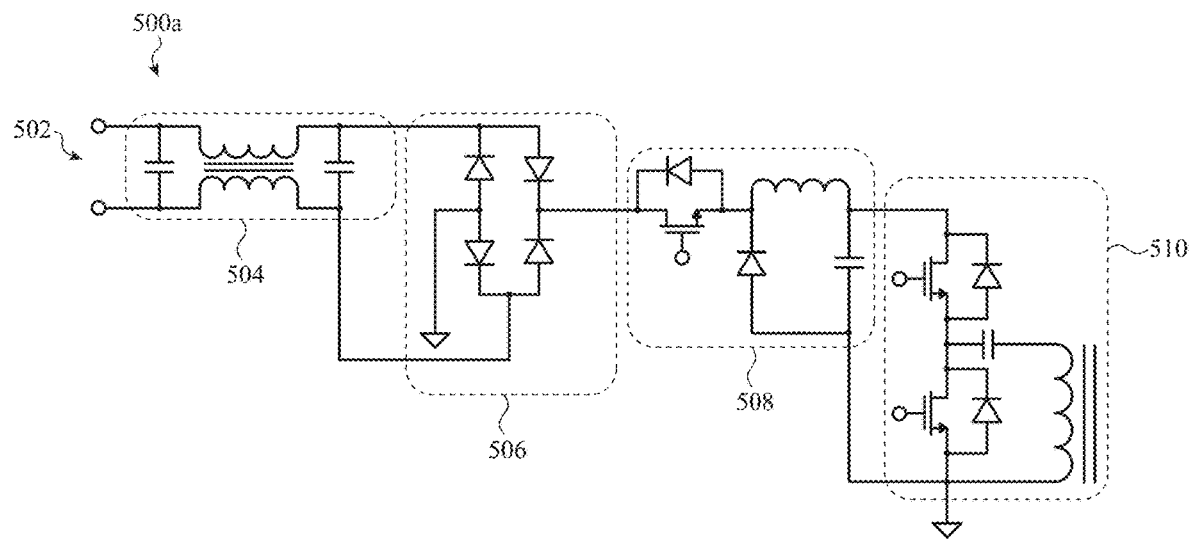
FIG. 5A is a simplified schematic diagram of a power converter including a wireless power transfer stage such as described herein
Figure 5B:
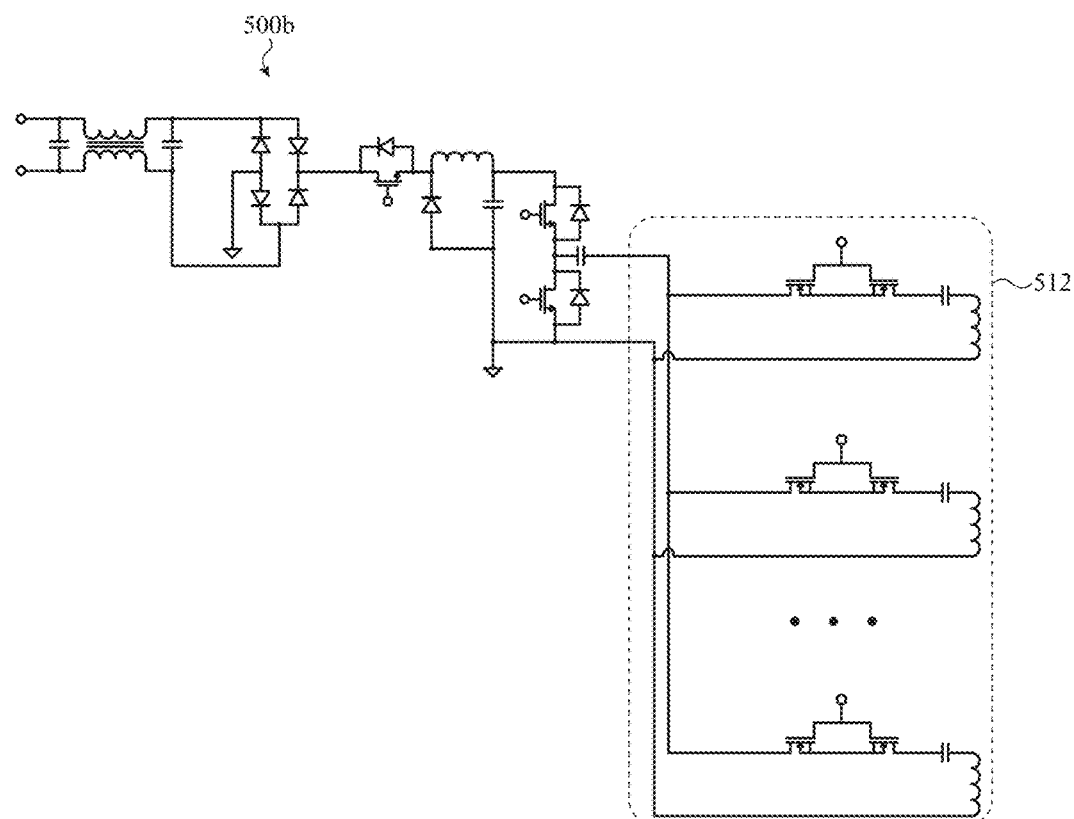
FIG. 5B is a simplified schematic diagram of a configuration of a power converter, such as the power converter depicted in FIG. 5A, particularly illustrating an array of selectable primary coils.

Specifically, FIG. 5A depicts a simplified schematic diagram of a power converter 500a including a wireless power transfer stage, such as described herein. The power converter 500a is transmitter side of a wireless power converter. As such, it is appreciated that any suitable receiver side, such as the receiver side(s) depicted in FIGS. 2A-2D, can be configured to operate with the power converter 500a.

The power converter 500a includes input terminals (identified as the input terminals 502) to receive unregulated and/or noisy high-voltage, low-frequency alternating current from a power source, such as mains voltage. The power converter 500a can include an electromagnetic interference filter stage 504 to reduce powerline noise present in the high-voltage, low-frequency alternating current received at the input terminals 502. An output of the electromagnetic interference filter stage 504 is coupled to an input of a rectifier stage 506.

The rectifier stage 506 is configured to output high-voltage rippled direct current that may be filtered by an output capacitor. An output of the rectifier stage 506 is coupled to an input of a step-down voltage converter stage 508. In many embodiments, the step-down voltage converter stage 508 is implemented with a buck converter topology, but this is not required. For example, in some embodiments a boost-buck topology can be used.

In this example, a buck converter can include a tank inductor and an output capacitor. A low-side lead of the tank inductor is coupled to a high-side lead of the output capacitor, which, in turn, is connected in parallel to an output ground lead of the buck converter. The output leads of the buck converter are typically connected to a high-frequency inverter, identified as the resonant inverter stage 510, described in greater detail below. In addition, in many cases, a compensation network or other regulator network is positioned between the output leads of the buck converter and the input leads of the resonant inverter stage 510. The compensation network can provide regulation and ripple smoothing to the voltage received by the resonant inverter stage 510. For simplicity of illustration, these components are not shown in FIG. 5A. In certain embodiments, such components may not be required.

A return diode couples a low-side lead of the output capacitor of the buck converter to a high-side lead of the tank inductor. The buck converter also includes a voltage-controlled switch (e.g., a power MOSFET) that couples the high-side lead of the tank inductor to an input lead of the buck converter. The input lead of the buck converter receives the input voltage, which in the illustrated example is the rippled direct current output from the rectifier stage 506.

The buck converter can be switched between an on-state and an off-state by toggling the voltage-controlled switch. The buck converter topology described above is referred herein as a "high-side" buck converter as a consequence of the direct connection between the voltage-controlled switch and the input voltage received from the rectifier stage 506.

When a high-side buck converter is in the on-state, the voltage-controlled switch is closed and a first current loop is defined from the input voltage source, through the tank inductor, to the resonant inverter stage 510. In this state, voltage across the tank inductor sharply increases to a voltage level equal to the difference between the instantaneous voltage across the resonant inverter stage 510 and the input voltage received from the rectifier stage 506. This voltage across the tank inductor induces current through the tank inductor to linearly increase. As a result of the topology of the depicted circuit, the current flowing through the tank inductor also flows to the output capacitor and to the resonant inverter stage 510.

Alternatively, when the high-side buck converter transitions to the off-state, the voltage-controlled switch is opened and a second current loop is defined through the return diode. In this state, voltage across the tank inductor sharply decreases to a voltage level equal to the difference between the voltage across the output leads of the buck converter and the cut-in voltage of the return diode. This voltage across the tank inductor is lower than when in the on-state, so current within the tank inductor linearly decreases in magnitude. The decreasing current flowing through the tank inductor also flows to the output capacitor and to the resonant inverter stage 510 connected across the output leads of the buck converter. In this manner, the output capacitor functions as a low-pass filter, generally reducing ripple in the voltage delivered from the output of the buck converter to the resonant inverter stage 510.

The buck converter can be efficiently operated by switching between the on-state and the off-state by toggling the voltage-controlled switch at a duty cycle selected based on the desired voltage applied across the resonant inverter stage 510. The voltage output from the buck converter is proportionately related to the input voltage by the duty cycle. This relationship can be modeled by Equation 1:

$$D_{cycle} = \frac{V_{out}}{V_{in}} \quad \text{Equation 1}$$

In one example, if direct current output from the rectifier stage 506 is 120 VDC and the desired output voltage is 40 VDC, a duty cycle of 33% may be selected.

In many cases, the buck converter is operated in a discontinuous conduction mode, although this may not be required. More particularly, if the buck converter is operated in a discontinuous conduction mode, current through the tank inductor regularly reaches 0.0 A. In some embodiments, the buck converter can be operated at or near resonance frequency of the tank inductor and the output capacitor.

In still further embodiments, the step-down voltage converter stage 508 can be implemented in another manner; it is appreciated that the example topology described above is merely one example of a suitable or appropriate step-down voltage converter.

For example, in another embodiment, the high-side lead of the tank inductor is coupled to a low-side lead of the output capacitor, which, in turn, is connected in parallel to the resonant inverter stage 510. The return diode couples a low-side lead of the tank inductor to a high-side lead of the output capacitor. The voltage-controlled switch couples the low-side lead of the tank inductor to a ground reference of the buck converter. This topology is referred to herein as a "low-side" buck converter as a consequence of the connection between the voltage-controlled switch and the input voltage ground reference. In some cases, a step-down voltage converter stage 508 may be implemented with a low-side buck converter in order to have the same ground reference between the rippled direct current ground (connected to the resonant inverter stage 510) and the output ground of the step-down voltage converter stage 508.

In many examples, the output of the step-down voltage converter stage 508 of the power converter 500a is rippled direct current having a voltage defined by the duty cycle at which the step-down voltage converter stage 508 is operated.

As noted above, the output of the step-down voltage converter stage 508 is coupled to a high-frequency inverter, identified as the resonant inverter stage 510. The resonant inverter stage 510 receives regulated direct current voltage from the step-down voltage converter stage 508 and toggles the conduction state of voltage-controlled switches associated with a half-bridge that is coupled to a resonant circuit including a primary coil and a resonant capacitor. As noted above, the resonant inverter stage 510 is typically configured to operate at a fixed switching frequency, but this may not be required. In some cases, an upper switch of the half-bridge is operated at a different duty cycle than a bottom switch of the half bridge (e.g., an asymmetric duty cycle), but this may not be required. In further embodiments, such as the power converter 500b depicted in FIG. 5B, the resonant inverter stage 510 can be coupled to an array of transmit coils 512 including a number of independently-controllable transmit coils.

The step-down voltage converter stage 508 is typically operated with peak-current control. A sense resistor (not shown) can be used to determine a current flowing through the step-down voltage converter stage 508 in order to determine when to transition the voltage-controlled switch to an off-state. Peak-current control can be implemented in any suitable manner, several of which are described in reference to FIGS. 6A-6C. It may be appreciated that peak-current control may provide current overload and/or overvolt protection to one or more components of the power converter 500a or the power converter 500b, whether such components or stages are associated with the transmitter side or the receiver side of the wireless power transfer stage.

Figure 6A:
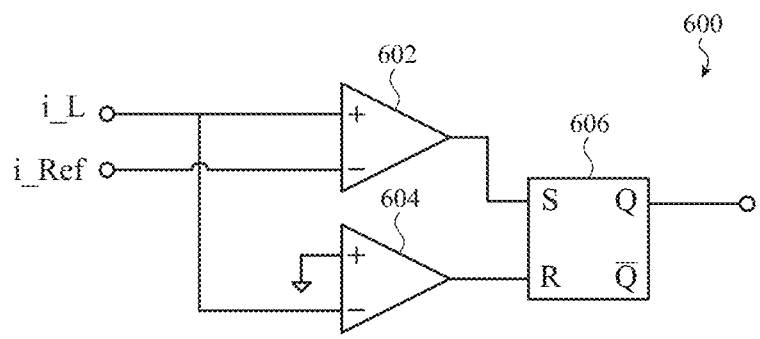
FIG. 6A is a simplified schematic diagram of a peak-current controller that can be used with the power converter depicted in FIG. 5A.

For example, FIG. 6A depicts a simplified schematic diagram of a peak-current controller that can be used with the power converter depicted in FIG. 5A. The peak-current controller 600 can receive input that corresponds to current through the tank inductor of the step-down voltage converter stage 508 as shown in FIG. 5A. The tank inductor current (or a voltage corresponding to that current) can be compared by a comparator 602 to a reference current input that corresponds to a maximum current permitted to circulate through the tank inductor of the step-down voltage converter stage 508 as shown in FIG. 5A. The output of the comparator 602 can be coupled to the set input of a flip-flop 606 that is coupled to a controller (not shown) configured to change the conduction state of the voltage-controlled switch of the step-down voltage converter stage 508 as shown in FIG. 5A. In addition, the inductor current can be compared to a ground reference by a comparator 604. The output of the comparator 604 can be coupled to the reset input of the flip-flop 606. In this embodiment, the comparator 602 toggles the conduction state of the voltage-controlled switch when received current exceeds a threshold value, whereas the comparator 604 toggles the conduction state of the voltage-controlled switch when the current through the tank inductor crosses zero. In another phrasing, the comparator 602 facilitates peak-current control for the step-down voltage converter stage 508 and the comparator 604 facilitates zero-voltage switching of the voltage-controlled switch.

Figure 6B:
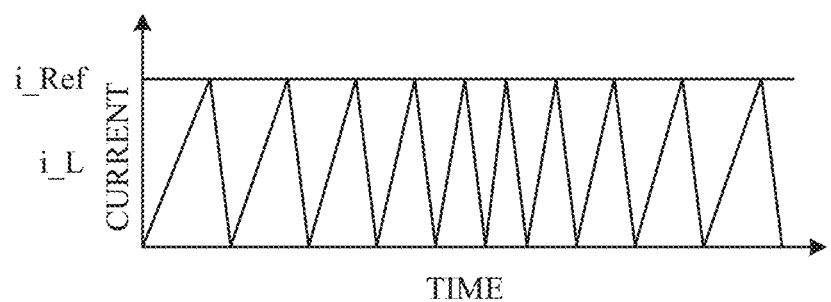
FIG. 6B is a signal diagram depicting constant peak current control operation of the peak-current controller depicted in FIG. 6A.
Figure 6C:
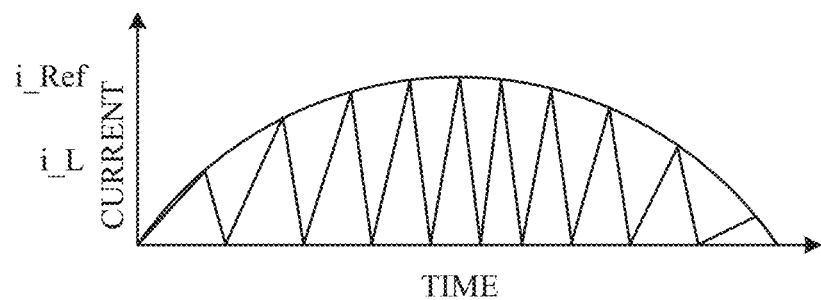
FIG. 6C is a signal diagram depicting variable peak current control operation of the peak-current controller depicted in FIG. 6A.

In some cases, the reference current input can be fixed, such as shown in FIG. 6B whereas in others, the reference current input can be variable, such as shown in FIG. 6C. More specifically, the reference current input can be configured to vary with (e.g., in phase with) input alternating current, such as mains voltage. The phase matching provided by the in-phase reference current input As noted above, a driving frequency of a resonant inverter stage of a power converter—incorporating a wireless power transfer stage—such as described with reference to FIGS. 5A-6C can be fixed. In other words, the resonant frequency of the primary coil and the secondary coil of the wireless power transfer stage can be selected for optimal performance at a wide variety of coupling factors (e.g., poor coupling between the primary coil and the secondary coil, good coupling between the primary coil and the secondary coil, ideal coupling between the primary coil and the secondary coil, and so on) and at a wide variety of load impedance across the leads of the secondary coil.

The optimal resonant frequency—or a resonant frequency that is close to optimal for a wide variety of operational conditions (e.g., variable coupling factors, variable receiver-side load impendence, and so on) can be selected in a number of ways.

In one example, a power converter including a transmitter side and a receiver side can be modeled as a linear time invariant system that is a network of three variable impedances: transmitter/primary side-based impedance $Z_p$, a mutual inductance-based impedance $Z_m$, and a receiver/secondary-based side impedance $Z_s$. In this model, the primary side impedance $Z_p$ is a function of the capacitance of the resonant capacitor, the inductance of the primary coil, and the resistance of the primary coil. The mutual inductance impedance $Z_m$ is based, at least in part, on the coupling coefficient between the primary coil and the secondary coil and the inductances of the primary coil and the secondary coil. The secondary side impedance $Z_s$ is a function of the capacitance of the resonant capacitor, the inductance of the secondary coil, and the resistance of the secondary coil.

In the referenced model, the primary side impedance $Z_p$ is in series with the secondary side impedance $Z_s$ and the direct current resistance of the load $R_l$. The mutual inductance impedance $Z_m$ is coupled between a node defined between the primary side impedance $Z_p$ and the secondary side impedance $Z_s$ and the resistance of the load $R_l$. As a result of this configuration, the direct current gain G from the transmitter side to the receiver side, as a function of resonance frequency and/or the fixed switching frequency $\omega_{sw}$ of the resonant inverter stage can be modeled with the following equation, where the quantity $V_{out}$ corresponds to a direct current voltage measured within the receiver side and where the quantity $V_{buck}$ corresponds to a direct current voltage measured at the output of a step-down voltage converter stage, such as the step-down voltage converter stage 508 depicted in FIG. 5A:

$$G(\omega_{sw}) = \frac{V_{out}}{V_{buck}} \qquad \text{Equation 2}$$

To determine the dependence of the direct current gain on the switching frequency, a frequency-domain transform can be performed. In one example, an s-transform is performed and modeled by the following equation in which n is equal to the turns ratio between the primary coil and the secondary coil:

$$G(s) = \frac{Z_\beta(s) \cdot R_l}{2 \cdot Z_\alpha(s) \cdot (Z_s(s) + R_l) \cdot n} \qquad \text{Equation 3}$$

In this s-transform, the function $Z_\beta(s)$ can be shown to be equal to:

$$Z_\beta(s) = \frac{(Z_s(s) + R_l) \cdot Z_m(s)}{Z_s(s) + R_l + Z_m(s)} \qquad \text{Equation 4}$$

In this s-transform, the function $Z_\alpha(s)$ can be shown to be equal to:

$$Z_\alpha(s) = Z_p(s) + Z_\beta(s) \qquad \text{Equation 5}$$

Figure 7A:
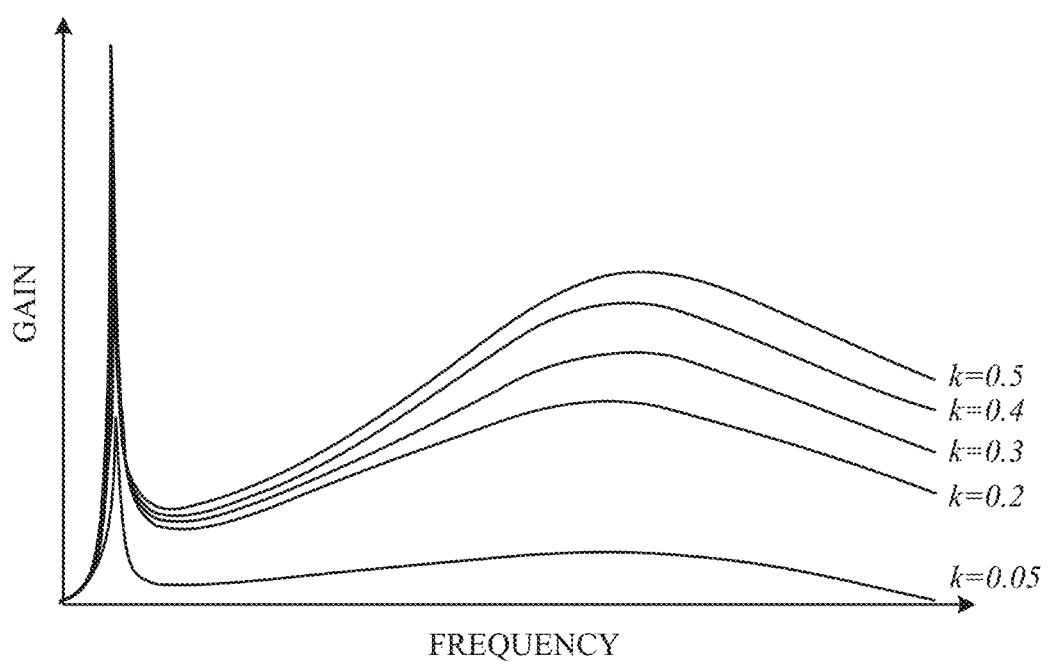
FIG. 7A is a direct current gain diagram depicting gain across a wireless power transfer stage of a power converter, such as described herein.

FIG. 7A depicts an example graph corresponding to a solution of Equation 3, showing direct current gain as a function of switching frequency $\omega_{sw}$. Separately, the example graph depicts changes in the direct current gain of the system as a function of a varied coupling coefficient k between the primary coil and the secondary coil. This graph corresponds to the condition in which the secondary coil experiences a maximum load (e.g., $R_l$ is substantially greater than zero ohms). The graph illustrates that for tightly-coupled coils (e.g., k≥0.5), a maximum gain can be achieved by selecting a switching frequency generally in the right-hand portion of the graph. As the coupling coefficient decreases, the switching frequency associated with maximum gain generally decreases.

Figure 7B:
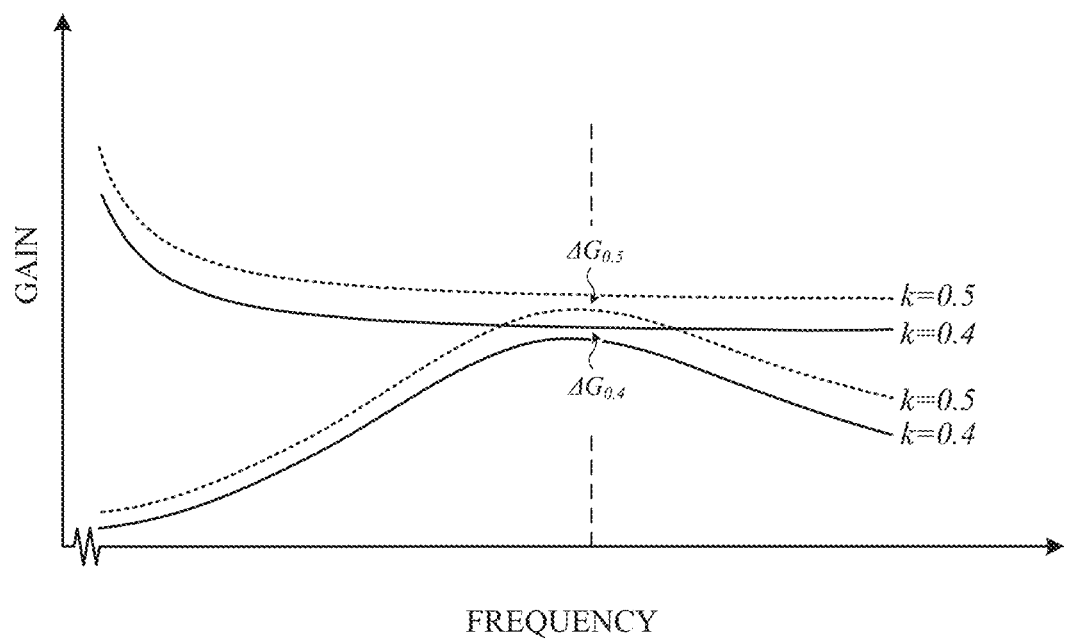
FIG. 7B is a detail view of a direct current gain diagram (such as the direct current gain diagram depicted in FIG. 7A) depicting gain variation between a no-load condition and a full-load condition at different coupling factors across a wireless power transfer stage of a power converter, such as described herein.

FIG. 7B illustrates a detail view of an example graph corresponding to a solution of Equation 3 as of switching frequency $\omega_{sw}$ when the coupling coefficient k is approximately equal to 0.5 or to 0.4. In addition, this example graph depicts changes in the direct current gain of the system as a function of variation in $R_l$. More particularly, dotted lines correspond to a coupling coefficient of k=0.5 and solid lines correspond to a coupling coefficient of k=0.4. The lines that have a generally downward slope from left to right are associated with minimum load (e.g., $R_l \gg 0.0\Omega$) whereas lines that have a generally bell-curved shape are associated with a maximum load (e.g., $R_l \cong 0.0\Omega$).

This figure illustrates that at a certain sampling frequency, denoted by a vertically-dotted line, a difference in gain across the wireless power transfer interface between a full-load condition and no-load condition is minimized for both depicted coupling coefficients. As such, a power converter, such as the power converter 500a depicted in FIG. 5A, configured to operate at this selected frequency will experience a minimum direct current gain variation across a wide range of loads and across a wide range of coupling coefficients. In other words, the switching frequency is select so that voltage output (e.g., within the receiver side) is consistent across a wide range of coupling coefficients.

Once the switching frequency is determined, the values for the resonant capacitors associated with the primary coil and the secondary coil can be determined so that the primary coil and the secondary coil resonate at the driving/switching frequency.

The foregoing embodiments depicted in FIGS. 5A-7B and the various alternatives thereof and variations thereto are presented, generally, for purposes of explanation, and to facilitate an understanding of various possible techniques for standardizing the gain across a wireless power converter substantially independent of coupling quality between a primary coil and a secondary coil and substantially independent of load. However, it will be apparent to one skilled in the art that some of the specific details presented herein may not be required in order to practice a particular described embodiment, or an equivalent thereof.

Still further embodiments can be implemented or can be configured to operate in a different manner. More specifically, a power converter such as described herein can be configured to include a step-up power converter stage integrated with a resonant inverter stage. As a result of the integration of two power conversion stages, fewer components may be required to implement the power converter.

For example, FIGS. 8A-8D describe a power converter that includes a combined inverter and voltage converter stage. The combined inverter and voltage converter stage is configured to output boosted direct current to a resonant inverter. Such a configuration can facilitate higher power output.

Figure 8A:
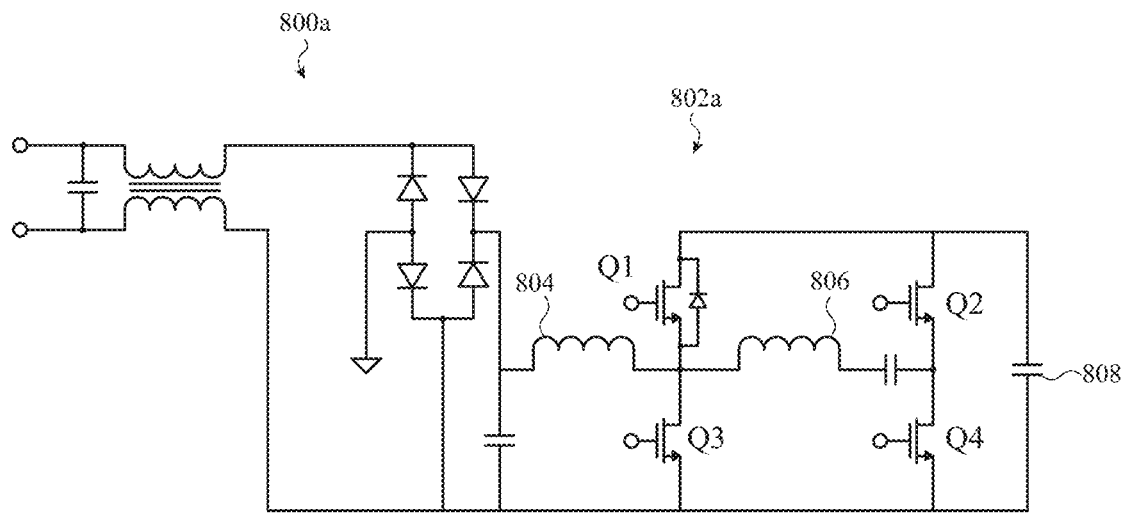
FIG. 8A is a simplified schematic diagram of a combined boost converter and inverter that can be used with a power converter, such as described herein.
Figure 8B:
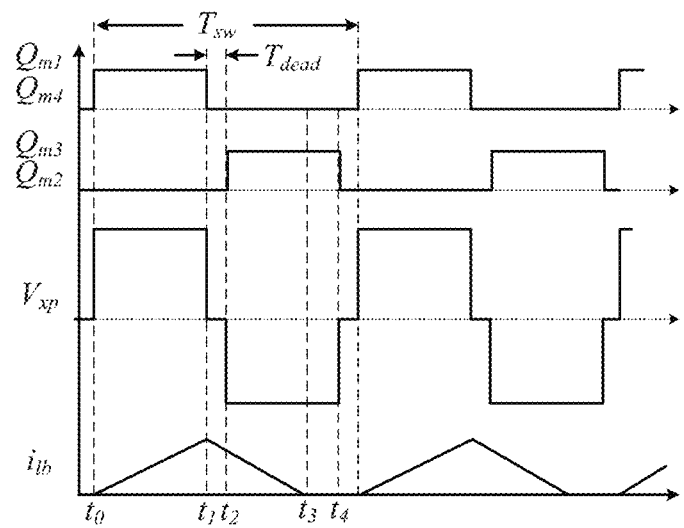
FIG. 8B is a signal timing diagram corresponding to the operation of the combined boost converter and inverter depicted in FIG. 8A.

More specifically, as shown in FIG. 8A, a power converter 800a can include a combined inverter and voltage converter stage 802a. The combined inverter and voltage converter stage 802a includes a full-bridge resonant inverter and a tank inductor 804. The full-bridge resonant inverter includes four switches identified as $Q_{m1}$, $Q_{m2}$, $Q_{m3}$, and $Q_{m4}$, arranged as two parallel half-bridges, a first half-bridge formed with $Q_{m1}$ and $Q_{m3}$ and a second half-bridge formed with $Q_{m2}$ and $Q_{m4}$.

The two upper switches of the two half-bridges (e.g., $Q_{m1}$ and $Q_{m2}$) are operated at a 50% duty cycle with dead time between upper and low side two switches (see, e.g., FIG. 10B). During the period over each of the upper switches of the two half-bridges are on, the tank inductor 804 can be charged by causing $Q_{m3}$ to conduct. If $Q_{m3}$ is turned off, the stored energy in inductor 804 is released to the storage capacitor 808 through the body diode of $Q_{m1}$.

Figure 8C:
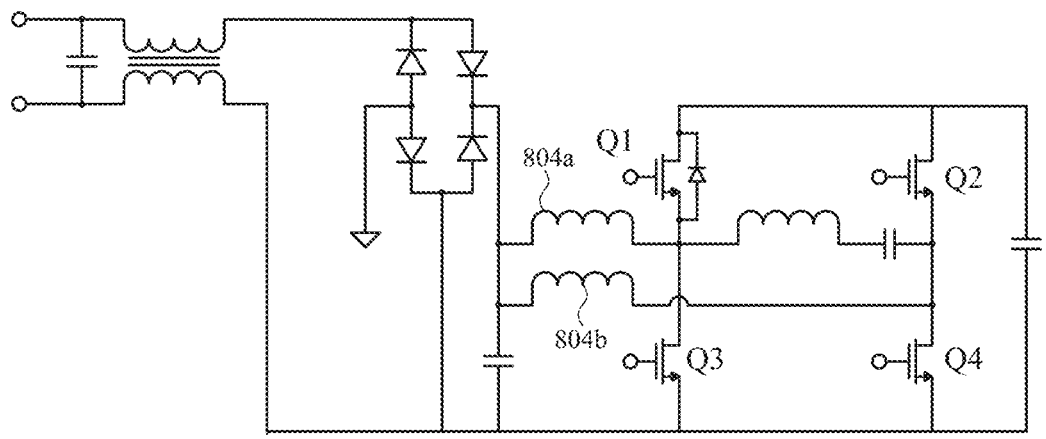
FIG. 8C is a simplified schematic diagram of another combined boost converter and inverter that can be used with a power converter, such as described herein.
Figure 8D:
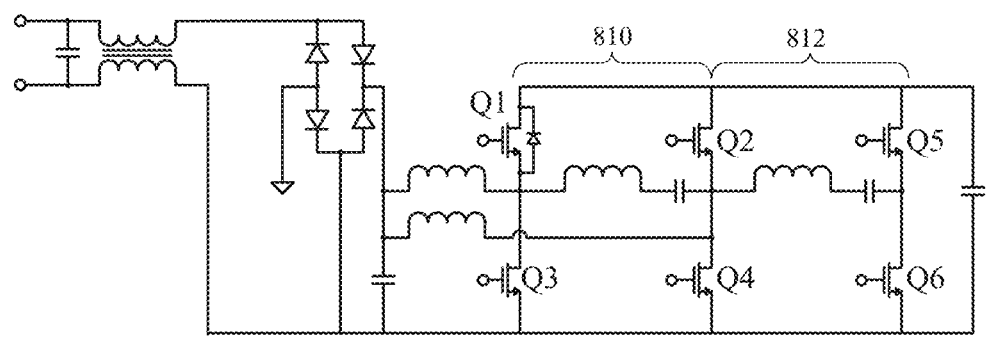
FIG. 8D is a simplified schematic diagram of yet another combined boost converter and inverter that can be used with a power converter, such as described herein.

At a later time, the tank inductor 804 can be discharged into a resonant inductor 806 of the inverter portion of the combined inverter and voltage converter stage 802a, thereby raising the voltage across the resonant inductor and increasing the maximum power output of the power converter 800a. In this manner, by magnetically coupling an output inductor to the inductor of the resonant inverter, a high-frequency and high-voltage output can be achieved. In further examples, more than one tank inductor can be included, such as shown in FIG. 8C. In this embodiment, the multiple tank inductors are identified as the first tank inductor 804a and the second tank inductor 804b. In still further embodiments, additional power output can be achieved by supplementing the resonant inverter with additional half-bridges, such as shown in FIG. 8D, which depicts a first half-bridge configuration 810 coupled to a second half-bridge configuration 812. It may be appreciated that additional power output can be obtained for each half-bridge daisy-chained in the manner illustrated in FIG. 8D.

The foregoing embodiments depicted in FIGS. 8A-8D and the various alternatives thereof and variations thereto are presented, generally, for purposes of explanation, and to facilitate an understanding of various possible techniques for increasing power output of a power converter. However, it will be apparent to one skilled in the art that some of the specific details presented herein may not be required in order to practice a particular described embodiment, or an equivalent thereof.

Figure 9:
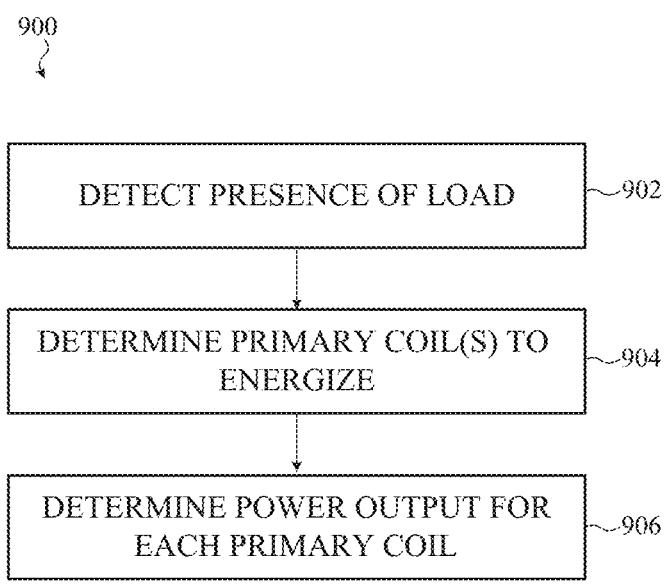
FIG. 9 is a simplified flow chart corresponding to a method of operating a power converter including a wireless power transfer stage, such as described herein.

FIG. 9 is a simplified flow chart corresponding to a method of operating a power converter including a wireless power transfer stage, such as described herein. The method 900 begins at operation 902 in which the presence of a load is detected. Thereafter, at operation 904, one or more primary coils are selected based on the position and/or orientation of a secondary coil associated with the detected load. Thereafter, at operation 906, a power output for the selected one or more primary coils can be determined.

Figure 10:
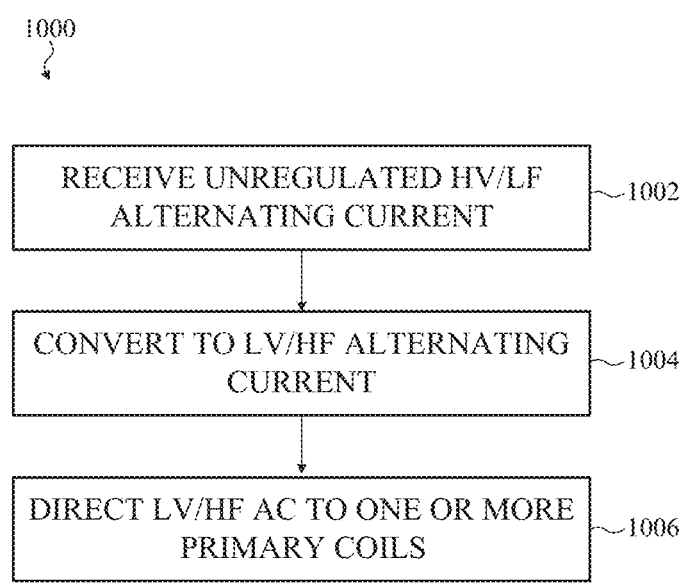
FIG. 10 is a simplified flow chart corresponding to another method of operating a power converter including a wireless power transfer stage, such as described herein.

FIG. 10 is a simplified flow chart corresponding to another method of operating a power converter including a wireless power transfer stage, such as described herein. The method 1000 begins at operation 1002 in which an unregulated high-voltage, low-frequency alternating current is received. Next, at operation 1004, the received current is converted to a low-voltage, high frequency alternating current. Next, at operation 1006 the low-voltage, high-frequency alternating current is directed to one or more primary coils of a wireless power transfer stage of a power converter such as described herein.

Figure 11:
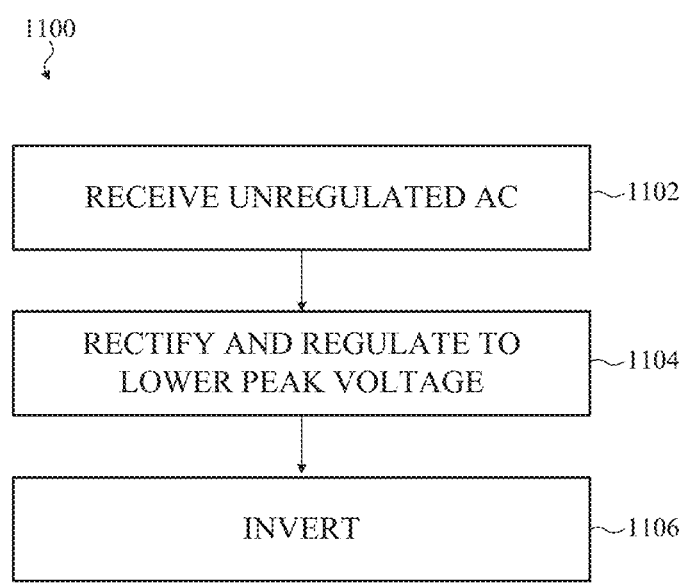
FIG. 11 is a simplified flow chart corresponding to another method of operating a power converter including a wireless power transfer stage, such as described herein.

FIG. 11 is a simplified flow chart corresponding to another method of operating a power converter including a wireless power transfer stage, such as described herein. The method 1100 begins at operation 1102 in which unregulated alternating current is received (e.g., mains voltage). Next, at operation 1104, the received current is rectified and regulated to a lower peak voltage. Finally, at operation 1106, the rectified and regulated current is inverted at a selected frequency.

Figure 12:
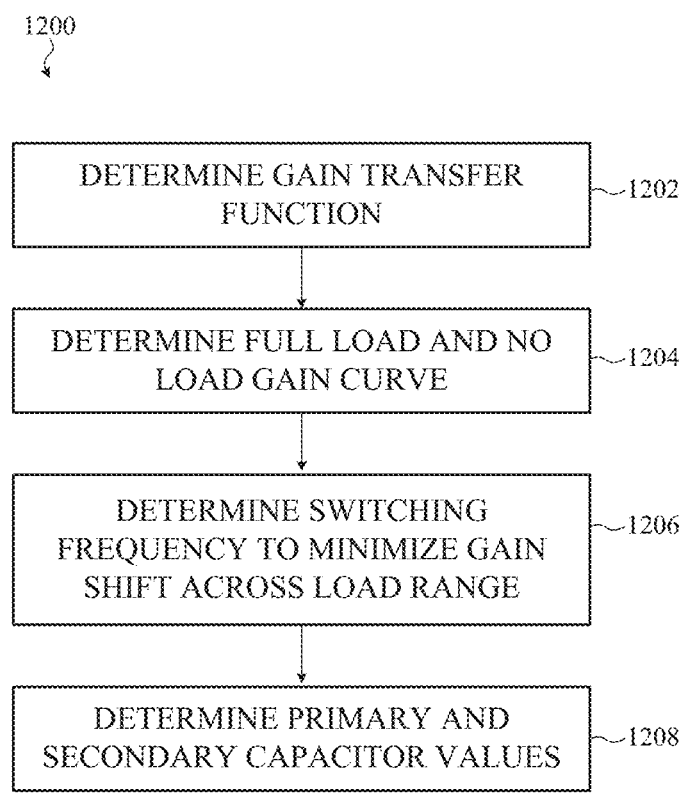
FIG. 12 is a simplified flow chart corresponding to another method of selecting resonant capacitors within a power converter including a wireless power transfer stage, such as described herein.

FIG. 12 is a simplified flow chart corresponding to another method of selecting resonant capacitors within a power converter including a wireless power transfer stage, such as described herein. The method 1200 begins at operation 1202 in which a gain transfer function for a particular wireless power converter is determined. Next, at operation 1204, full-load conditions and no-load conditions, based on the gain transfer function, are determined. Next, at operation 1206, a switching frequency is selected that minimizes gain variation or gain shift across a variety of loads. Finally, at operation 1208, primary and secondary resonant capacitor values can be determined.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

What is claimed is:

1. A power converter comprising:
    a rectifier stage accommodated within a low-profile housing and configured to receive unregulated alternating current mains voltage;
    a step-down voltage converter stage accommodated within the low-profile housing and configured to receive a rippled direct current voltage from the rectifier stage;
    an inverter stage accommodated within the housing and configured to receive a lowered rippled and regulated voltage from the step-down voltage converter stage; and
    a wireless power transfer stage comprising a primary coil accommodated within the low-profile housing and configured to receive an alternating current from the inverter stage, the alternating current having a frequency greater than the unregulated alternating current mains voltage.

2. The power converter of claim 1, wherein the step-down voltage converter stage comprises a peak current controller configured to define a maximum current delivered to the primary coil of the wireless power transfer stage.

3. The power converter of claim 1, wherein:
    the rectifier stage is a first rectifier stage;
    the low-profile housing is a first housing;
    the step-down voltage converter stage is a first step-down voltage converter stage;
    the rectified voltage is a first rectified voltage;

the alternating current is a first alternating current;
the wireless power stage further comprises a secondary coil accommodated within a second housing and configured to receive a second alternating current from the primary coil; and
the power converter further comprises:
a second rectifier stage accommodated within the second housing and configured to receive the alternating current from the secondary coil; and
a second step-down voltage converter stage accommodated within the second housing and configured to receive a second rectified voltage from the second rectifier stage.

4. The power converter of claim 3, wherein the second step-down voltage converter stage comprises a peak current controller configured to define a maximum current delivered to a battery charging circuit accommodated in the second housing.

5. The power converter of claim 3, wherein:
the wireless power transfer stage further comprises a capacitor coupled to the primary coil to define a resonant circuit configured to resonate at a selected frequency; and
the capacitor is accommodated within the first housing.

6. The power converter of claim 5, wherein:
the resonant circuit is a first resonant circuit and the capacitor is a first capacitor; and
the wireless power transfer stage further comprises a second capacitor coupled to the secondary coil define a second resonant circuit configured to resonate at the selected frequency; and
the second capacitor is accommodated within the second housing.

7. The power converter of claim 6, wherein the first capacitor, the second capacitor, and the selected frequency are configured to reduce direct current gain variation between the lowered regulated voltage to an output of the second step-down voltage converter stage.

8. The power converter of claim 7, wherein the wireless power transfer stage further comprises a controller configured to control a duty cycle of the first primary coil to regulate a maximum level of the first alternating current.

9. The power converter of claim 1, wherein the primary coil is a first primary coil of an array of primary coils accommodated in the first housing.

10. A power converter comprising:
a first alternating current converter stage accommodated within a first housing and configured to:
receive unregulated mains voltage and to convert the unrelated mains voltage into a rippled direct current voltage; and
output a first low-voltage high-frequency alternating current having a frequency greater than the unregulated mains voltage;
a wireless power transfer stage comprising:
a primary coil accommodated within the first housing and configured to receive the low-voltage high-frequency alternating current; and
a secondary coil accommodated within a second housing and configured to receive a second low-voltage high-frequency alternating current from the primary coil;
a second alternating current converter stage accommodated within the second housing and configured to:
receive a low-voltage high-frequency alternating current; and
output a low-voltage direct current; and
a battery charging circuit accommodated within the second housing and configured to receive the low-voltage direct current from the second alternating current converter stage and to charge a rechargeable battery with the low-voltage direct current.

11. The power converter of claim 10, wherein the first housing is associated with a first electronic device and the second housing is associated with a second electronic device.

12. The power converter of claim 11, wherein the second electronic device is a portable electronic device.

13. The power converter of claim 11, wherein the first housing defines an interface surface that receives the second electronic device.

14. The power converter of claim 10, wherein the primary coil and the secondary coil are configured for resonant operation.

15. A method of converting an unregulated mains voltage comprising:
rectifying the unregulated mains voltage to a first rippled voltage;
reducing and regulating the first rippled voltage with a first peak-current controlled buck converter to a first reduced voltage;
inverting the reduced voltage with a resonant inverter comprising a primary coil that induces a secondary coil to resonate;
rectifying an output of the secondary coil to a second rectified voltage;
reducing and regulating the second rectified voltage with a second peak-current controlled buck converter to a second reduced voltage; and
charging a rechargeable battery with the second reduced voltage.

16. The method of claim 15, wherein at least one of the first peak-current controlled buck converter and the second peak-current controlled buck converter is a voltage-mode buck converter.

17. The method of claim 15, wherein the resonant inverter, the first peak-current controlled buck converter, and the second peak-current controlled buck converter are operated with zero-voltage switching.

18. The method of claim 15, wherein:
the primary coil is a first primary coil of a distribution of primary coils; and
the method further comprises:
selecting the first primary coil; and
associating the first primary coil with a maximum current.

19. The method of claim 18, further comprising:
selectively coupling and decoupling the first primary coil from the resonant inverter at a duty cycle selected based on the maximum current.

\* \* \* \* \*